(12) United States Patent
Nagasaki et al.

(10) Patent No.: US 9,665,031 B2
(45) Date of Patent: May 30, 2017

(54) IMAGE FORMING APPARATUS THAT FORMS LATENT IMAGE BY IRRADIATING PHOTOSENSITIVE MEMBER WITH LIGHT

(71) Applicant: CANON KABUSHIKI KAISHA, Tokyo (JP)

(72) Inventors: Osamu Nagasaki, Suntou-gun (JP); Go Araki, Suntou-gun (JP); Hidenori Kanazawa, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/040,436

(22) Filed: Feb. 10, 2016

(65) Prior Publication Data

US 2016/0246208 A1 Aug. 25, 2016

(30) Foreign Application Priority Data

Feb. 19, 2015 (JP) ................................ 2015-031054

(51) Int. Cl.
| | | |
|---|---|---|
| *G03G 15/04* | (2006.01) | |
| *G03G 15/00* | (2006.01) | |
| *G03G 15/043* | (2006.01) | |
| *H04N 1/387* | (2006.01) | |
| *H04N 1/401* | (2006.01) | |

(52) U.S. Cl.
CPC .......... *G03G 15/043* (2013.01); *H04N 1/387* (2013.01); *H04N 1/401* (2013.01)

(58) Field of Classification Search
CPC .......... G03G 15/043; G03G 15/04072; G03G 15/0415; B41J 2/471; G02B 26/124; G02B 26/127

USPC ........................................ 399/4, 51; 347/224
See application file for complete search history.

(56) References Cited

U.S. PATENT DOCUMENTS

| | | | |
|---|---|---|---|
| 4,532,552 A | 7/1985 | Uno .............................. 358/302 |
| 2011/0228029 A1* | 9/2011 | Miyadera ............. G03G 15/043 |
| | | | 347/224 X |
| 2013/0050388 A1* | 2/2013 | Ohnishi ............... G03G 15/043 |
| | | | 347/224 |
| 2013/0141510 A1 | 6/2013 | Araki .................... G02B 26/124 |
| 2015/0124124 A1* | 5/2015 | Maeyama ........... H04N 5/2355 |
| | | | 348/235 |

FOREIGN PATENT DOCUMENTS

| | | |
|---|---|---|
| JP | S58-125064 | 7/1983 |
| JP | H08-101357 | 4/1996 |

(Continued)

OTHER PUBLICATIONS

U.S. Appl. No. 15/169,402, filed May 31, 2016.

(Continued)

*Primary Examiner* — Sophia S Chen
(74) *Attorney, Agent, or Firm* — Fitzpatrick, Cella, Harper & Scinto

(57) ABSTRACT

A scanning unit performs scanning over a photosensitive member with a laser beam irradiated from a light source. A width correction unit corrects exposure time. A luminance correction unit corrects luminance of the laser beam for forming latent images. A density correction unit corrects a density value of each of the pixels of the image data according to a scanning position of the laser beam on the surface of the photosensitive member.

19 Claims, 20 Drawing Sheets

(56) References Cited

FOREIGN PATENT DOCUMENTS

| | | |
|---|---|---|
| JP | H11-265106 | 9/1999 |
| JP | 2000-190554 | 7/2000 |
| JP | 2001-066524 | 3/2001 |
| JP | 2005-096351 | 4/2005 |
| JP | 2006-171318 | 6/2006 |

OTHER PUBLICATIONS

U.S. Appl. No. 15/040,448, filed Feb. 10, 2016; Inventors: Shuhei Watanabe, Hidenori Kanazawa, Takashi Kawana, Junya Kobayashi, Hiroyuki Fukuhara.

\* cited by examiner

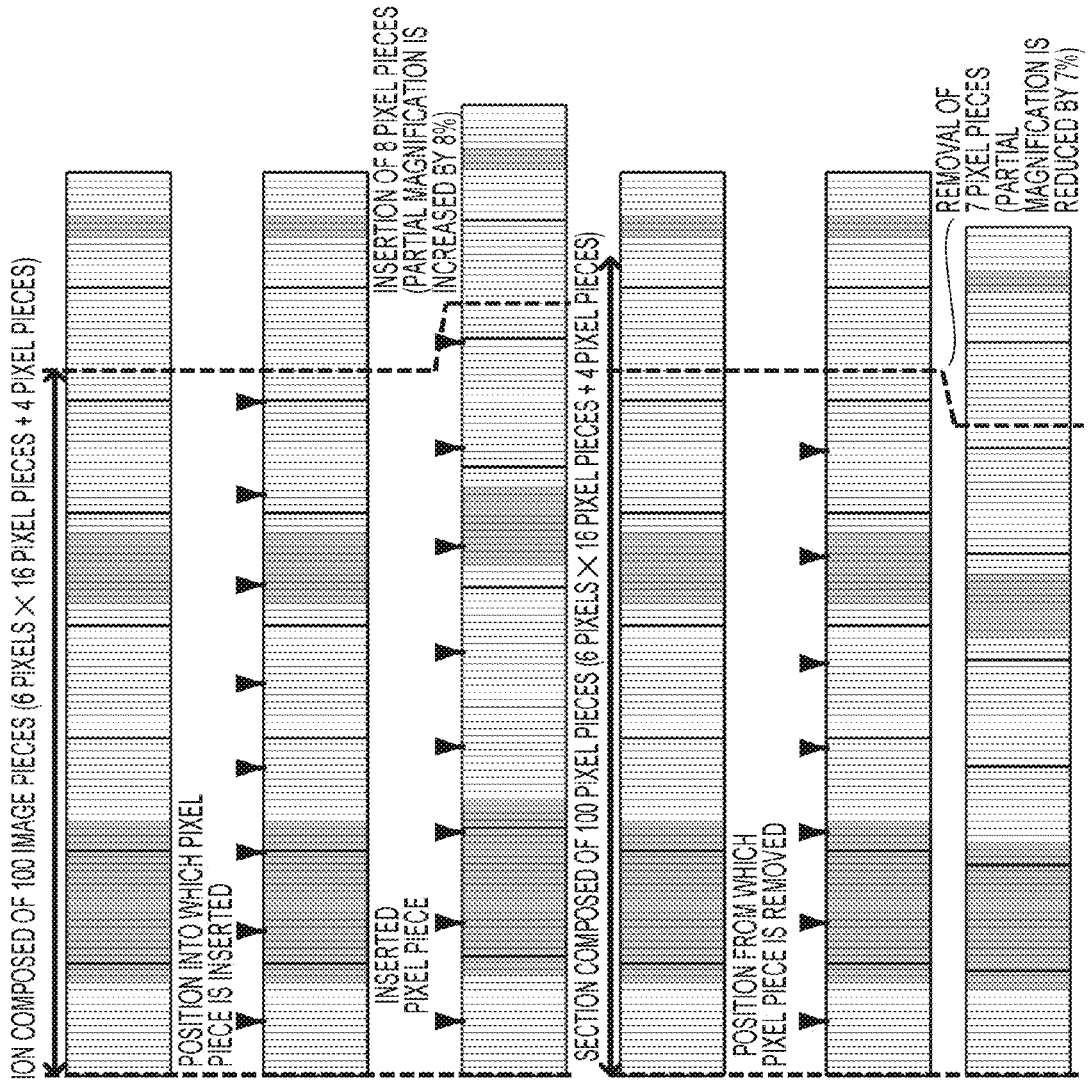

| DATA_A | DATA_B | |
|---|---|---|
| | SUB AREA 3 | SUB AREA 6 |
| | x=1.35% | x=2.7% |
| FFh | FCh | F9h |
| C0h | BDh | BBh |
| 80h | 7Eh | 7Ch |
| 40h | 3Fh | 3Eh |
| 00h | 00h | 00h |

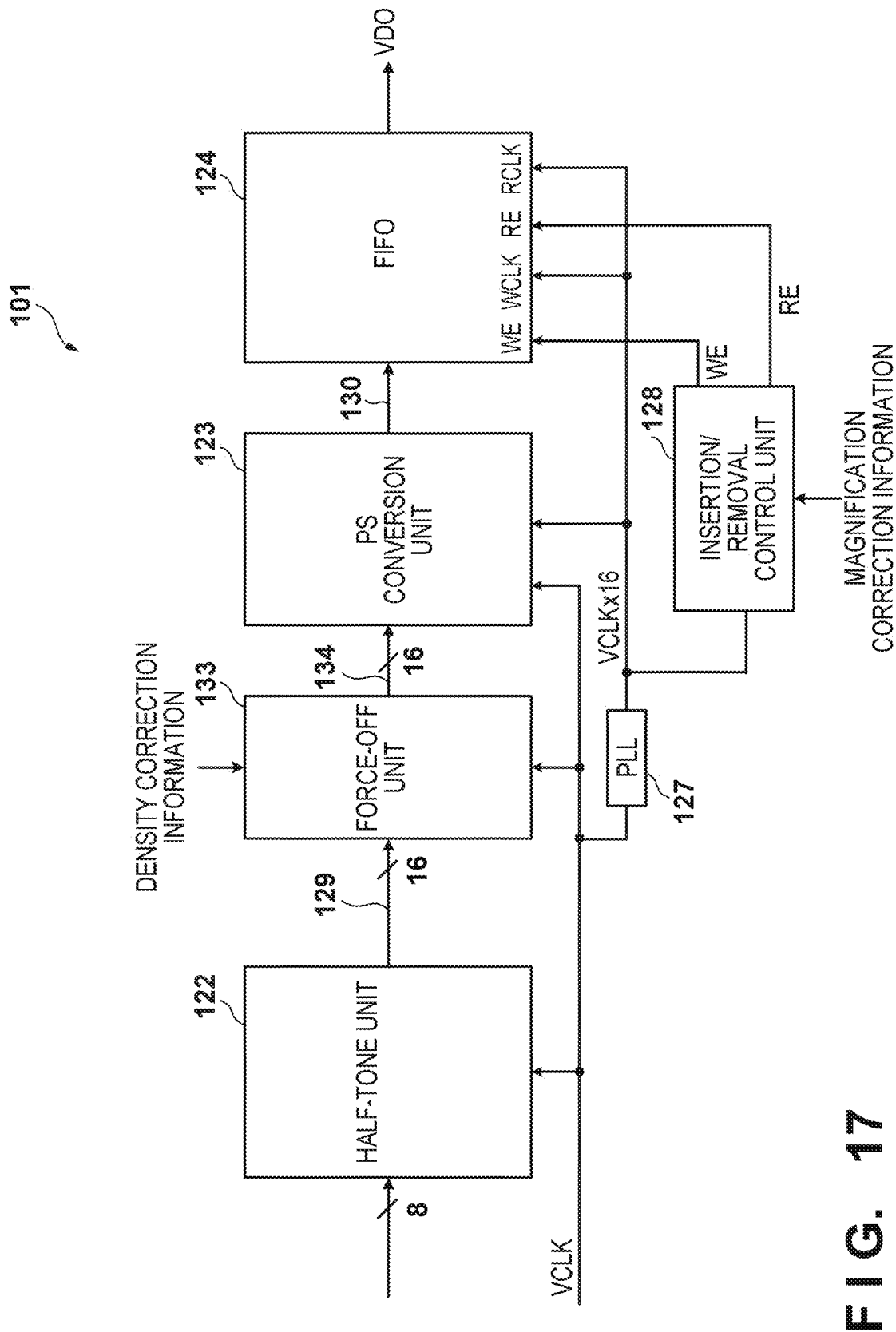
F I G. 17

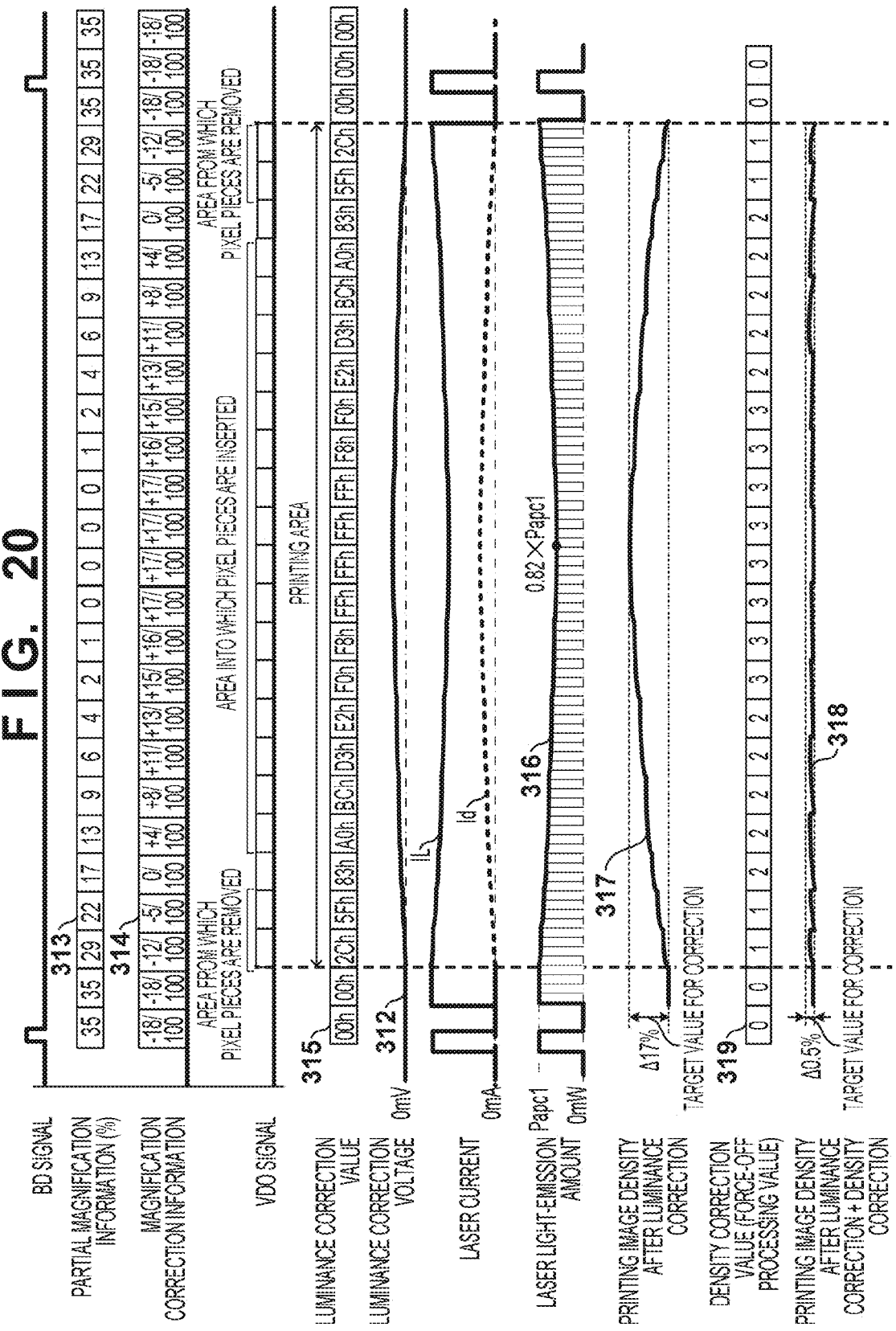

IMAGE FORMING APPARATUS THAT FORMS LATENT IMAGE BY IRRADIATING PHOTOSENSITIVE MEMBER WITH LIGHT

BACKGROUND OF THE INVENTION

Field of the Invention

The present invention relates to image forming apparatuses such as laser beam printers, digital copiers, and digital facsimiles.

Description of the Related Art

Electrophotographic image forming apparatuses have an optical scanning unit for forming an electrostatic latent image by exposing a photosensitive member to light. The optical scanning unit exposes the image forming surface of the photosensitive member to light by emitting a laser beam based on image data, reflecting the laser beam with a rotating polygonal mirror, causing the laser beam to pass through a scanning lens, and thereby irradiating the photosensitive member with the laser beam. The scanning lens is a lens that has so-called fθ characteristics. fθ characteristics are the optical characteristics that form an image of a laser beam on the surface of a photosensitive member such that the spot of the laser beam on the surface of the photosensitive member moves at a constant speed while a rotating polygonal mirror is rotating at a constant angular velocity. By using a scanning lens with the fθ characteristics, the exposure length (i.e., the dot width) per pixel in the main scanning direction is maintained at a constant length.

Scanning lenses with the fθ characteristics have a relatively large size, and their cost is high. In order to reduce the size and the cost of an image forming apparatus, it is conceivable to not use a scanning lens, or otherwise use a small scanning lens without the fθ characteristics. Japanese Patent Laid-Open No. S58-125064 discloses changing the image clock frequency of an optical scanning unit in which the spot of a laser beam on the surface of a photosensitive member does not move on the surface of the photosensitive member at a constant speed such that the widths of dots that are to be formed on the surface of the photosensitive member are equal.

According to Japanese Patent Laid-Open No. S58-125064, there is the advantage that the widths of dots to be formed on the surface of the photosensitive member are equal despite the use of a scanning lens without the fθ characteristics. However, since the moving speed of the spot of the laser beam on the surface of the photosensitive member is not constant, the exposure amount per unit area differs for dots in an edge portion of the photosensitive member and dots in a central portion of the photosensitive member. In other words, even if the same image data is used, the image density of dots in an edge portion of the photosensitive member and the image density of dots in a central portion of the photosensitive member differ from each other, which causes density unevenness and color unevenness.

SUMMARY OF THE INVENTION

The present invention provides an image forming apparatus with reduced density unevenness despite the use of an optical system in which the moving speed of the spot of a laser beam on the surface of a photosensitive member is not constant.

The present invention provides an image forming apparatus comprising the following elements. A photosensitive member. A scanning unit performs scanning over the photosensitive member with the laser beam that is irradiated from a light source. A width correction unit corrects exposure time for individual latent images respectively corresponding to pixels of the image data such that widths of the latent images in a moving direction of the spot of the laser beam are equal. A luminance correction unit corrects luminance of the laser beam for forming latent images such that an exposure amount per unit time is greater for a second position than for a first position among exposure positions on the photosensitive member. The first position is scanned at a first scanning speed, and the second position is scanned at a second scanning speed that is higher than the first scanning speed. A density correction unit corrects a density value of each of the pixels of the image data according to a scanning position of the laser beam on the surface of the photosensitive member.

Further features of the present invention will become apparent from the following description of exemplary embodiments (with reference to the attached drawings).

BRIEF DESCRIPTION OF THE DRAWINGS

FIG. 10A is a diagram illustrating insertion of pixel pieces.

FIG. 10B is a diagram illustrating removal of pixel pieces.

FIG. 17 is a block diagram showing an image modulation unit.

FIG. 20 is a time chart illustrating partial magnification correction and luminance correction.

DESCRIPTION OF THE EMBODIMENTS

Image Forming Apparatus

Figure 1:
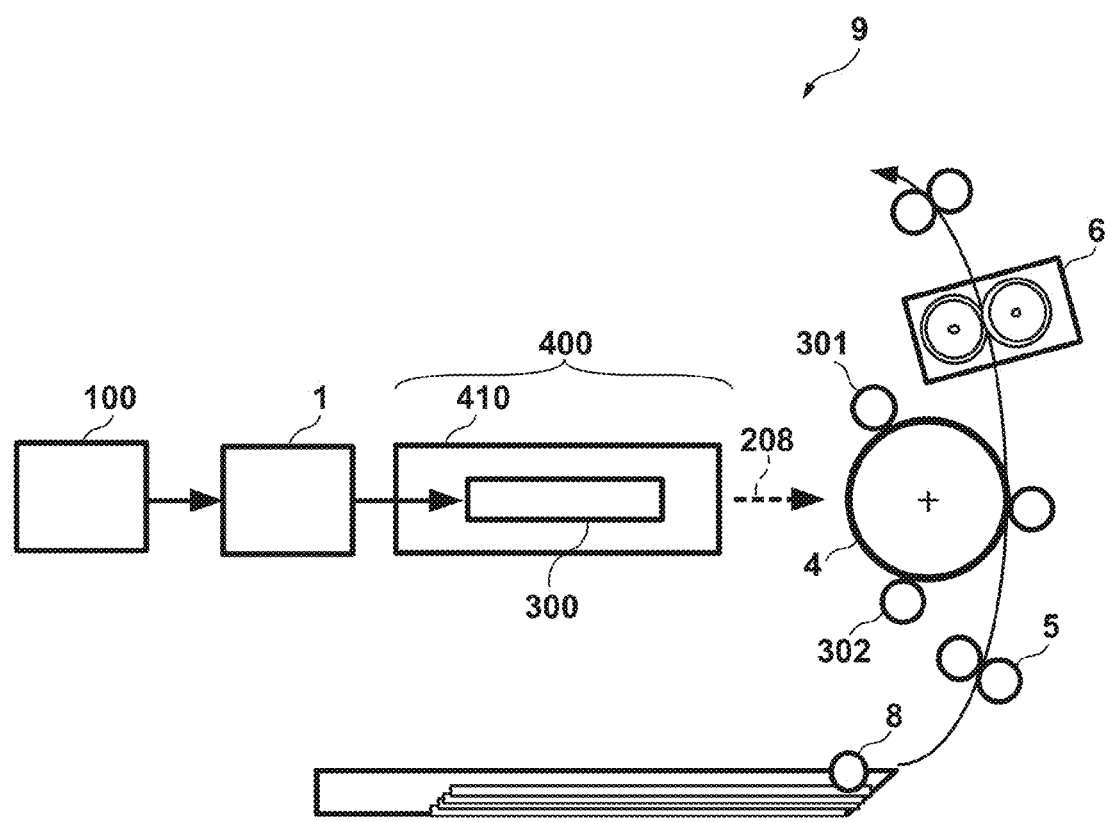
FIG. 1 is a schematic configuration diagram of an image forming apparatus.

FIG. 1 is a schematic configuration diagram of an image forming apparatus 9. A laser drive unit 300 that drives a light source is housed within a housing 410 of an optical scanning device 400. The optical scanning device 400 outputs a laser beam 208 from a light source based on an image signal that is output from an image signal generation unit 100 and a control signal that is output from a control unit 1. A charging unit 301 charges the surface (image forming surface) of a photosensitive drum 4, which is a photosensitive member, to a uniform potential. The optical scanning device 400 irradiates and scans the surface of the photosensitive drum 4, which has been charged to a uniform potential, with a laser beam in accordance with image data, thereby forming an electrostatic latent image thereon. The photosensitive drum 4 is sometimes also referred to as a photosensitive member or an image carrier that carries an electrostatic latent image or a toner image. A developing device 302 develops a latent image that has been formed on the surface of the photosensitive drum 4 by using toner, thereby forming a toner image. A conveyance roller 5 coveys a recording medium that has been fed from a paper feed unit 8. A toner image is transferred onto a recording medium in a transfer unit that is configured with the photosensitive drum 4 and a transfer roller. A fixing unit 6 fixes a toner image that has been transferred onto a recording medium by applying heat and pressure. Note that a toner image may be subjected to primary transfer onto an intermediate transfer member and then subjected to secondary transfer from the intermediate transfer member to a recording medium.

Optical Scanning Device

Figure 2A:
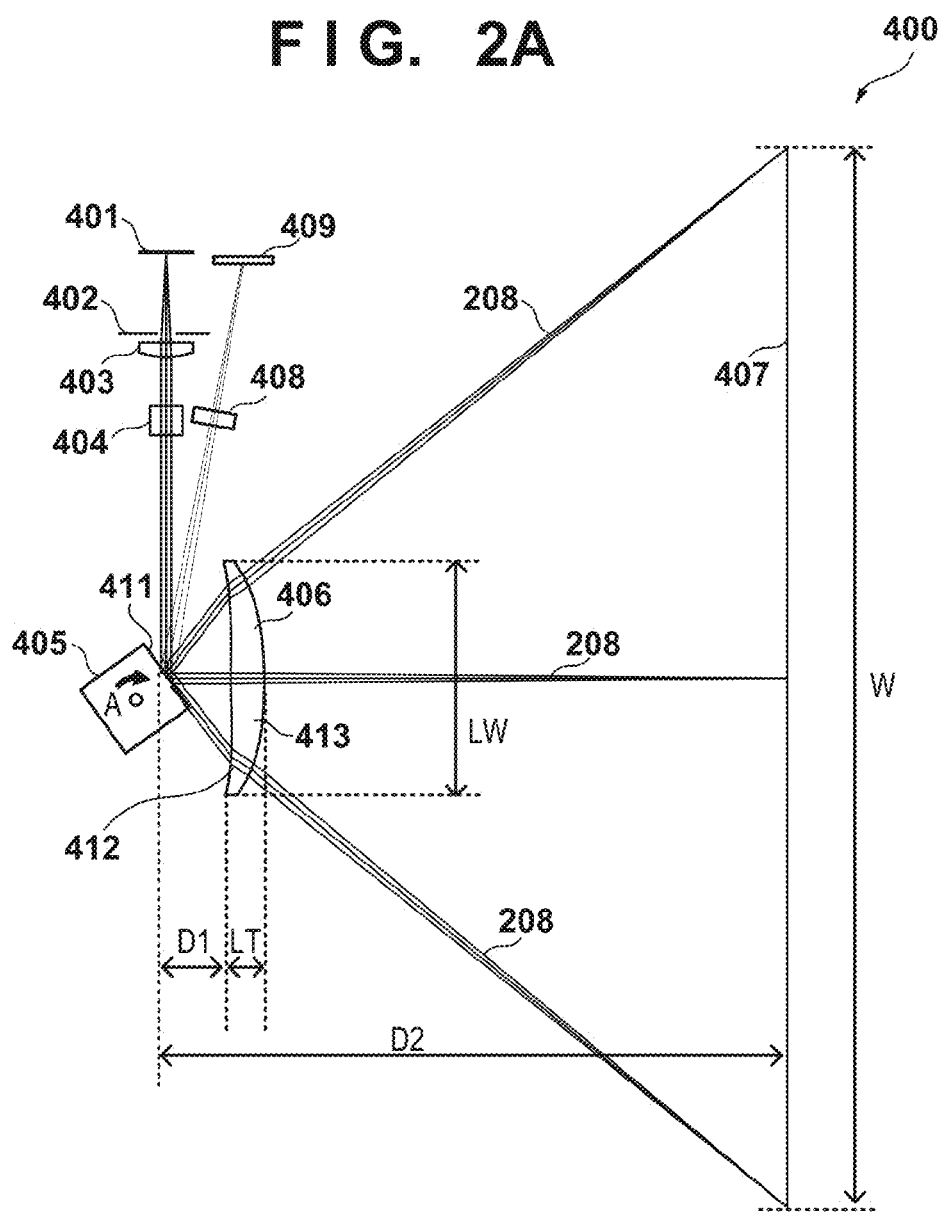
FIG. 2A is a cross-sectional diagram of an optical scanning device along a main scanning direction.
Figure 2B:
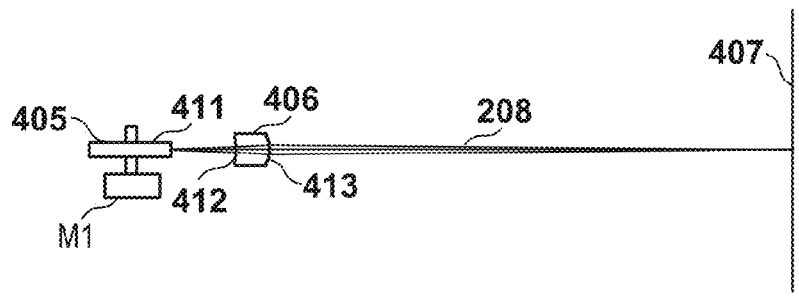
FIG. 2B is a cross-sectional diagram of the optical scanning device along a sub scanning direction.

FIG. 2A shows a cross section of the optical scanning device 400 along the main scanning direction, and FIG. 2B shows a cross section of the optical scanning device 400 along the sub scanning direction. Various kinds of optical members, such as a light source 401, a coupling lens 403, an anamorphic lens 404, an imaging lens 406, and a deflector 405 are housed within the housing 410 of the optical scanning device 400.

The light source 401 of the optical scanning device 400 is a light source that outputs a laser beam based on image data. The laser beam 208, which is a luminous flux that has been emitted from the light source 401, is shaped into an ellipsoidal shape by an aperture diaphragm 402, and then enters the coupling lens 403. The luminous flux that has passed through the coupling lens 403 is converted into substantially parallel light, and enters the anamorphic lens 404. Note that substantially parallel light may refer to light that converges weakly or light that diffuses weakly. The anamorphic lens 404 within the cross section along the main scanning direction has positive refractive power, and converts an incident luminous flux into convergent light within the cross section along the main scanning direction. The anamorphic lens 404 converges a luminous flux to the vicinity of a deflective surface 411 of the deflector 405 within the cross section along the sub scanning direction, and forms a line image that is elongated in the main scanning direction. The deflector 405 is an example of a scanning unit that performs scanning with the laser beam 208 that is output from the light source 401. The deflector 405 may be a rotating polygonal mirror that is driven to rotate by a motor Ml as shown in FIG. 2B, or a resonant mirror that vibrates back and forth.

The luminous flux that has passed through the anamorphic lens 404 is reflected by the deflective surface (reflective surface) 411 of the deflector 405. The laser beam 208 that has been reflected by the deflective surface 411 passes through the imaging lens 406, and enters the surface of the photosensitive drum 4. The imaging lens 406 is provided between the deflector 405 and the photosensitive drum 4 in the light path of the laser beam 208, and is an example of an optical system that the laser beam 208 passes through. Note that the imaging lens 406 may be a member of an optical system in which scanning speed, which is the moving speed of the spot of the laser beam 208 on the surface of the photosensitive drum 4, is not constant. An imaging mirror may be provided between the imaging lens 406 and the surface of the photosensitive drum 4. The imaging lens 406 is an imaging optical element. In the present invention, an imaging optical system is composed of the imaging lens 406 alone, i.e., a single imaging optical element. The surface of the photosensitive drum 4, which the laser beam 208 that has passed (transmitted) through the imaging lens 406 enters, is a scanned surface 407 that is subjected to scanning with the laser beam 208. The imaging lens 406 forms an image of the laser beam 208 on the scanned surface 407, thereby forming an image (a spot) having a predetermined spot-like shape. A drive unit, which is not shown in the drawings, rotates the deflector 405 in the direction indicated by the arrow A at a constant angular velocity. Consequently, the spot moves on the scanned surface 407 in the main scanning direction, and forms an electrostatic latent image on the scanned surface 407. Note that the main scanning direction is the direction that is parallel with the surface of the photosensitive drum 4 and that is orthogonal to the moving direction of the surface of the photosensitive drum 4. In other words, the main scanning direction is parallel with the rotation shaft of the photosensitive drum 4. The sub scanning direction is the direction that is orthogonal to the main scanning direction and the optical axis of the laser beam 208. A BD sensor 409 and a BD lens 408 are members of an optical system for synchronization that determines the timing of writing an electrostatic latent image on the scanned surface 407. "BD" is the abbreviation for "beam detect". The luminous flux that has passed through the BD lens 408 enters, and is detected by, the BD sensor 409 that includes a photodiode. The control unit 1 controls the writing timing based on the timing at which the BD sensor 409 detects the luminous flux.

The light source 401 is a semiconductor laser chip, for example. The light source 401 according to the present embodiment includes one light-emitting unit 11 (see FIG. 4). However, the light source 401 may be a multi-beam light source that includes a plurality of light-emitting units that can be independently subjected to light-emission control. A plurality of luminous fluxes that are output from a multi-beam light source each reach the scanned surface 407 via the coupling lens 403, the anamorphic lens 404, the deflector 405, and the imaging lens 406. On the scanned surface 407, spots that each correspond to the laser beam 208 are formed at positions that are shifted from each other in the sub scanning direction.

Imaging Lens

As shown in FIGS. 2A and 2B, the imaging lens 406 has two optical surfaces (lens surfaces), namely an entrance surface (first surface) 412 and an exit surface (second surface) 413. The imaging lens 406 within the cross section along the main scanning direction allows for scanning on the scanned surface 407 with the laser beam 208 that has been deflected by the deflective surface 411, with desired scanning characteristics. The imaging lens 406 also changes the shape of the spot of the laser beam 208 on the scanned surface 407 to a desired shape. Due to the imaging lens 406, within the cross section along the sub scanning direction, the vicinity of the deflective surface 411 and the vicinity of the scanned surface 407 are in a conjugate relationship. Consequently, a mirror surface tilt can be compensated (i.e., when the deflective surface 411 tilts, the displacement of the scanning position on the scanned surface 407 in the sub scanning direction can be reduced).

The imaging lens 406 according to the present embodiment is, for example, a plastic mold lens formed by injection molding. However, a glass mold lens may be adopted as the imaging lens 406. Either kind of mold lens can be easily formed to have an aspheric shape, and is suitable for mass production. Therefore, it is possible to improve the productivity and the optical performance by adopting a mold lens as the imaging lens 406.

It is assumed that the imaging lens 406 according to the present embodiment does not have the so-called fθ characteristics. In other words, the imaging lens 406 does not have the scanning characteristics of moving the spot of the luminous flux passing through the imaging lens 406 at a constant speed on the scanned surface 407, despite the deflector 405 rotating at a constant angular velocity. In this way, by using the imaging lens 406 without the fθ characteristics, it is possible to position the imaging lens 406 near the deflector 405 (i.e., at a position with a reduced distance D1). The imaging lens 406 without the fθ characteristics can have a smaller size than imaging lenses with the fθ characteristics. In other words, it is possible to reduce a width LW of the imaging lens 406 in the main scanning direction, and it is possible to reduce a thickness LT of the imaging lens 406 in the optical axis direction. In this way, by adopting the imaging lens 406 without the fθ characteristics, it is possible to reduce the size of the housing 410 of the optical scanning device 400. In addition, a lens with the fθ characteristics has a steep change in the shape of the entrance surface and the exit surface in the cross section along the main scanning direction. Such restrictions on the shape degrade the imaging performance. In contrast, the imaging lens 406 does not have the fθ characteristics and has a less steep change in the shape of the entrance surface 412 and the exit surface 413 in the cross section along the main scanning direction. Therefore, the imaging lens 406 achieves preferable imaging performance.

The scanning characteristics of the imaging lens 406 according to the present embodiment as described above are represented by Formula (1) below.

$$Y=(K/B)\times\tan(B\times\theta) \quad (1)$$

The sign θ denotes the scanning angle (scanning field angle) according to the deflector 405. The sign Y (mm) denotes the convergence position (the image height) of the laser beam 208 on the scanned surface 407 in the main scanning direction. The sign K (mm) denotes an imaging coefficient corresponding to an on-axis image height. The sign B denotes a coefficient (scanning characteristics coefficient) that determines the scanning characteristics of the imaging lens 406. In the present embodiment, the expression "on-axis image height" refers to the image height of a position on the optical axis (Y=0=Ymin), and corresponds to the scanning angle θ=0. Also, the expression "off-axis image height" refers to the image height (Y≠0) of a position outside the central optical axis (the optical axis when the scanning angle θ=0), and corresponds to the scanning angle θ≠0. The expression "outermost off-axis image height" refers to the image height (Y=+Ymax, or Y=−Ymax) when the scanning angle θ is the maximum (the maximum scanning field angle). The sign W denotes the width in the main scanning direction of a predetermined area (a scanning area) on the scanned surface 407 in which a latent image can be formed. The scanning width W is expressed by W=|+Ymax|+|−Ymax|. The center of the scanning area corresponds to the on-axis image height, and the edges of the scanning area correspond to the outermost off-axis image height.

The imaging coefficient K is a coefficient that corresponds to f of the scanning characteristics (the fθ characteristics, Y=fθ) when parallel light enters the imaging lens 406. In other words, the imaging coefficient K is a coefficient for bringing the convergence position Y and the scanning angle θ into a proportional relationship as with the fθ characteristics when a luminous flux other than parallel light enters the imaging lens 406.

The following supplements the coefficients related to the scanning characteristics. When B=0, Formula (1) is Y=Kθ. That is, the scanning characteristics when B is 0 correspond to the scanning characteristics Y=fθ of an imaging lens used in a conventional optical scanning device. When B=1, Formula (1) is Y=K tan θ. Such scanning characteristics correspond to projection characteristics Y=f tan θ of a lens used in an imaging apparatus (camera) and the like. That is, by setting the scanning characteristics coefficient B within the range of 0≤B≤1, it is possible to achieve intermediate scanning characteristics between the projection characteristics Y=f tan θ and the fθ characteristics Y=fθ.

Here, differentiation of Formula (1) with respect to the scanning angle θ leads to the scanning speed of the luminous flux on the scanned surface 407 relative to the scanning angle θ as shown in Formula (2) below.

$$dY/d\theta = K/\cos^2(B\theta) \quad (2)$$

Furthermore, dividing Formula (2) by the speed dY/dθ=K at the on-axis image height leads to Formula (3) below.

$$(dY/d\theta)/K - 1 = \cos^2(B\theta) \quad (3)$$

Formula (3) expresses the amount of deviation of the scanning speed (the partial magnification) at each off-axis image height relative to the scanning speed at the on-axis image height. In the optical scanning device 400 according to the present embodiment, the scanning speed of the luminous flux is different in the case of the on-axis image height and in the case of an off-axis image height, except for when B=0.

Figure 3:
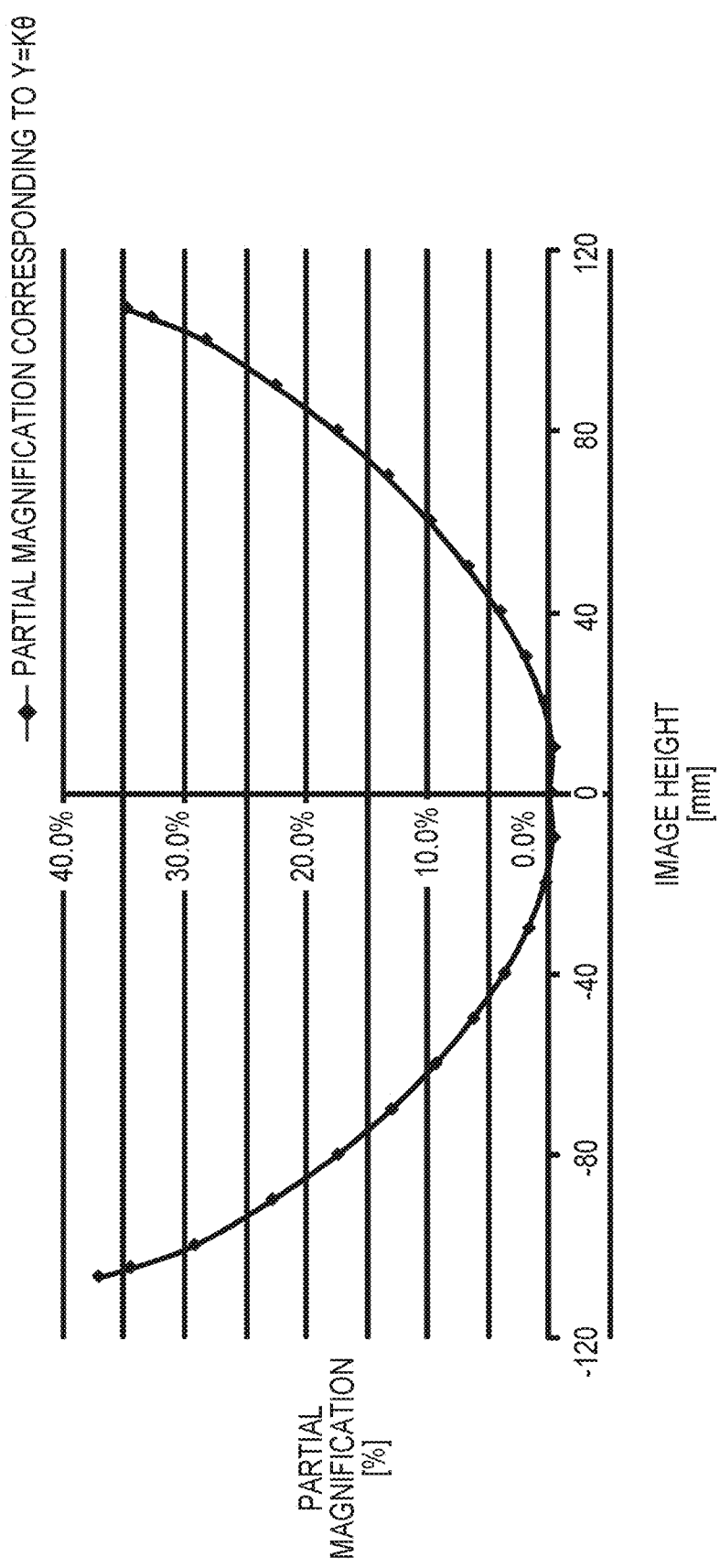
FIG. 3 is a diagram showing partial magnification characteristics relative to an image height.

FIG. 3 shows the relationship between the image height and the partial magnification when fitting of the scanning position on the scanned surface 407 according to the present embodiment is performed with the characteristics Y=Kθ. In the present embodiment, the imaging lens 406 is provided with the scanning characteristics expressed by Formula (1). As shown in FIG. 3, the scanning speed gradually increases as the image height changes from the on-axis image height to an off-axis image height, and accordingly the partial magnification increases. A partial magnification of 30% means that the irradiation length (exposure length) of the scanned surface 407 in the main scanning direction is 1.3 times longer when irradiation with light is performed for a unit period of time. Therefore, if the pixel width in the main scanning direction is determined at constant time intervals according to the period of the image clock signal, the pixel density will be different between the on-axis image height and an off-axis image height.

The scanning speed gradually increases as the image height Y changes away from the on-axis image height and approaches the outermost off-axis image height (as the absolute value of the image height Y increases). Consequently, the time required for scanning the unit length when the image height is close to the outermost off-axis image height is shorter than the time required for scanning the unit length when the image height on the scanned surface 407 is close to the on-axis image height. This means that when the luminance of light emitted from the light source 401 is constant, the total exposure amount per unit length when the image height is close to the outermost off-axis image height is smaller than the total exposure amount per unit length when the image height is close to the on-axis image height. In other words, the exposure amount is relatively insufficient at the edges of the scanning area, and the exposure amount is relatively excessive at the center of the scanning area.

With the above-described optical configuration, variations in the partial magnification with respect to the main scanning direction and in the total exposure amount per unit length are problematic in maintaining a preferable image quality. Therefore, in order to achieve a preferable image quality, the image forming apparatus 9 according to the present embodiment performs partial magnification correction, and luminance correction that is the correction of the total exposure amount per unit length.

In particular, note that the difference between the scanning speed at the above-described on-axis image height and the scanning speed at the above-described outermost off-axis image height increases as a light path length D2 from the deflector 405 to the photosensitive drum 4 decreases, because the field angle increases accordingly. According to due consideration by the inventors, it is difficult to maintain a preferable image quality with an optical configuration in which the scanning speed at the outermost off-axis image height is higher than or equal to 120% of the scanning speed at the on-axis image height, i.e., the ratio of change of the scanning speed is higher than or equal to 20%. In particular, variations in the partial magnification with respect to the main scanning direction and variations in the total exposure amount per unit length become prominent.

The ratio of change C (%) of the scanning speed is expressed by Formula (4) below.

$$C=((V\max-V\min)/V\min)\times 100 \quad (4)$$

Here, the sign Vmin denotes the lowest scanning speed, and the sign Vmax denotes the highest scanning speed. With the optical configuration according to the present embodiment, the scanning speed at the on-axis image height (at the center of the scanning area) is the lowest, and the scanning speed at the outermost off-axis image height (at the edges of the scanning area) is the highest.

According to due consideration by the inventors, in the case of an optical configuration with a field angle that is greater than or equal to 52°, the ratio of change C of the scanning speed is greater than or equal to 35%. The conditions with which the field angle is greater than or equal to 52° are as follows. For example, in the case of an optical configuration for forming a latent image having a width in the main scanning direction that is equivalent to the short sides of an A4 sheet, the scanning width W is 214 mm, and the light path length D2 (see FIG. 2A) from the deflective surface 411 to the scanned surface 407 when the scanning field angle is 0° is shorter than or equal to 125 mm. In the case of an optical configuration for forming a latent image having a width in the main scanning direction that is equivalent to the short sides of an A3 sheet, the scanning width W is 300 mm, and the light path length D2 (see FIG. 2A) from the deflective surface 411 to the scanned surface 407 when the scanning field angle is 0° is shorter than or equal to 247 mm. The image forming apparatus 9 having such optical configurations can achieve a preferable image quality when the configuration described below according to the present embodiment is adopted.

Exposure Control

Figure 4:
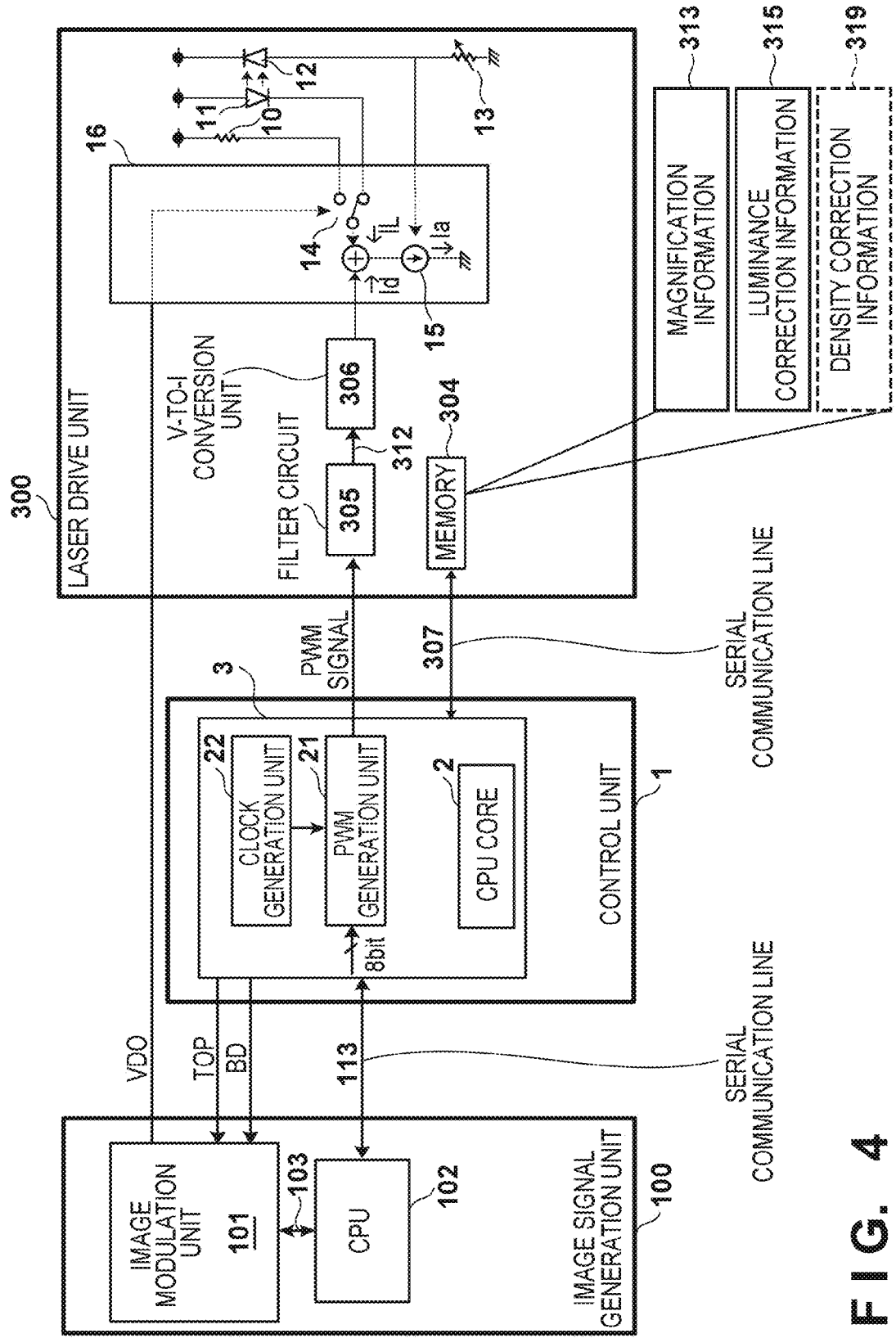
FIG. 4 is a block diagram showing an exposure control unit.

FIG. 4 is a block diagram showing a configuration for exposure control in the image forming apparatus 9. The image signal generation unit 100 has an image modulation unit 101 that receives image data (an image signal) from a host computer or an image scanner and generates a video signal (a VDO signal) that corresponds to the image data. A CPU 102 controls the image modulation unit 101 via a CPU bus 103. The image signal generation unit 100 has the function of a pixel width correction unit and the function of a density correction unit for correcting the image density. The control unit 1 controls the image forming apparatus 9, and controls the amount of light of the light source 401 as a luminance correction unit. The control unit 1 includes an IC 3. The IC 3 includes a CPU core 2, a clock generation unit 22 that generates a clock signal, and a PWM generation unit 21 that generates a PWM signal. The CPU core 2 performs serial communication with the CPU 102 via a serial communication line 113.

The laser drive unit 300 has a laser driver IC 16, a filter circuit 305, a V-to-I conversion unit 306, and a memory 304. The laser driver IC 16 has a switch 14 and a constant current circuit 15, for example. The filter circuit 305 filters the PWM signal. The V-to-I conversion unit 306 coverts the voltage of the PWM signal that has been filtered into a current. The memory 304 is a non-volatile storage unit, and stores therein control parameters related to the laser drive unit 300. The control parameters are read out by the CPU core 2 via a serial communication line 307. The laser drive unit 300 also has a dummy resistor 10, the light-emitting unit 11, a photodetector 12, and a variable resistor 13. The laser driver IC 16 controls the switch 14 based on a VDO signal and causes the light-emitting unit 11 of the light source 401 to emit light.

The CPU 102 of the image signal generation unit 100, upon completion of preparations for outputting a VDO signal, instructs the CPU core 2 of the control unit 1 via the serial communication line 113 to start printing. The CPU core 2 of the control unit 1, upon completion of preparations for printing, transmits a TOP signal, which is a sub scanning synchronization signal, and a BD signal, which is a main scanning synchronization signal, to the image signal generation unit 100. The image signal generation unit 100 outputs a VDO signal, which is an image signal, to the laser drive unit 300 at a predetermined timing based on these synchronization signals.

Figure 5A:
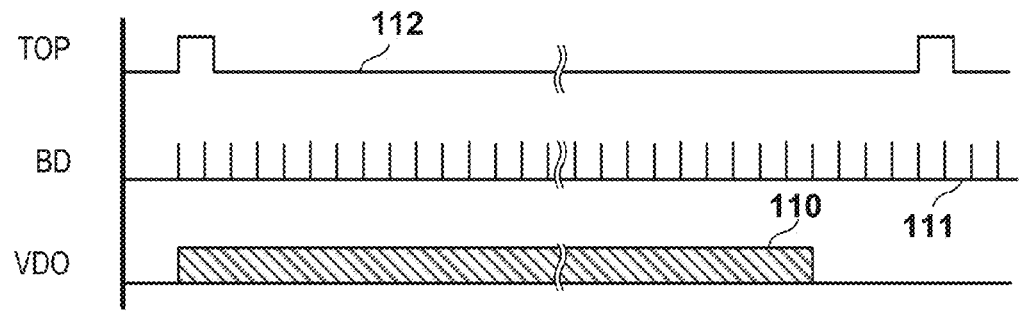
FIG. 5A is a time chart showing a synchronization signal and an image signal.

FIG. 5A is a timing chart showing the synchronization signals and the image signal in the case where image forming for a single page of the recording medium is performed. Time advances in the direction from left to right in the drawing. A HIGH level of the TOP signal 112 indicates that the leading end of the recording medium has reached a predetermined position on the conveyance passage. Upon detecting "HIGH" of the TOP signal 112, the image signal generation unit 100 transmits a VDO signal 110 in synchronization with the BD signal 111. The light source 401 emits light based on this VDO signal 110, and a latent image is formed on the photosensitive drum 4.

In FIG. 5A, for the sake of simplification of the drawing, the VDO signal is depicted as if it was continuously output over a plurality of BD signals. In reality, however, the VDO signal is output during a predetermined period of time within the period from when a BD signal is output and when the subsequent BD signal is output.

Partial Magnification Correction

Figure 5B:
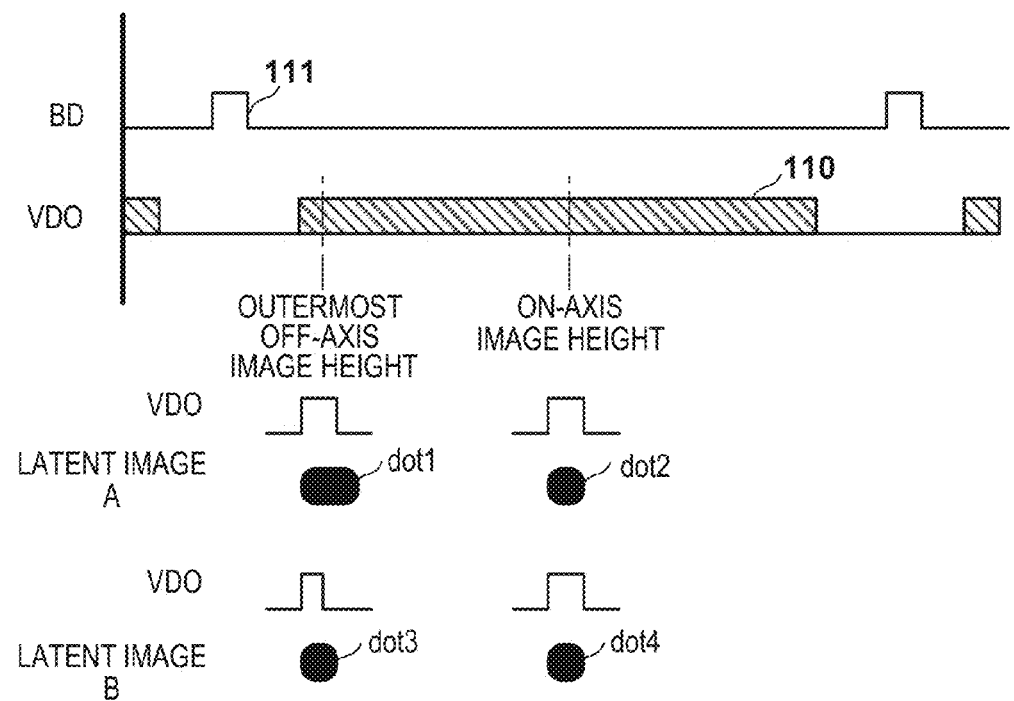
FIG. 5B is a diagram showing a dot image on a scanned surface.

Next, a description is given of partial magnification correction. Before the description, the cause of partial magnification and the principles for correction are described with reference to FIG. 5B. FIG. 5B shows the timing of the BD signal and the VDO signal, and a dot image formed with a latent image on the scanned surface 407. Time advances in the direction from left to right in the drawing.

The image signal generation unit 100 transmits the VDO signal when a predetermined period of time has elapsed since detection of a rising edge of the BD signal. Consequently, a latent image is formed from a position that is away from the left edge of the photosensitive drum 4 by a desired distance. The light source 401 emits light based on the VDO signal, and a latent image that corresponds to the VDO signal is formed on the scanned surface 407.

The following describes a case where a latent image having the shape of a dot is formed at the on-axis image height and the outermost off-axis image height by causing the light source 401 to emit light during the same length of time based on the VDO signal. The size of this dot is equivalent to the size of one dot in the case of 600 dpi (the width is 42.3 um in the main scanning direction). In the optical scanning device 400, the scanning speed at the edges of the scanned surface 407 (at the outermost off-axis image height) is higher than the scanning speed at the center of the scanned surface 407 (at the on-axis image height). As indicated by a latent image A, a dot 1 of the latent image at the outermost off-axis image height is elongated in the main scanning direction compared to a dot 2 of the latent image at the on-axis image height. Therefore, in order to correct the partial magnification, the period and the time width of the VDO signal is corrected in the present embodiment according to the position in the main scanning direction (image height). That is, the light emission interval for the outermost off-axis image height is made shorter than the light emission interval for the on-axis image height. Consequently, as indicated by a latent image B, a latent image dot 3 at the outermost off-axis image height is corrected to have the same size as a latent image dot 4 at the on-axis image height. Such correction makes it possible to form dot-shaped latent images respectively corresponding to pixels at substantially equal intervals in the main scanning direction.

Figure 6:
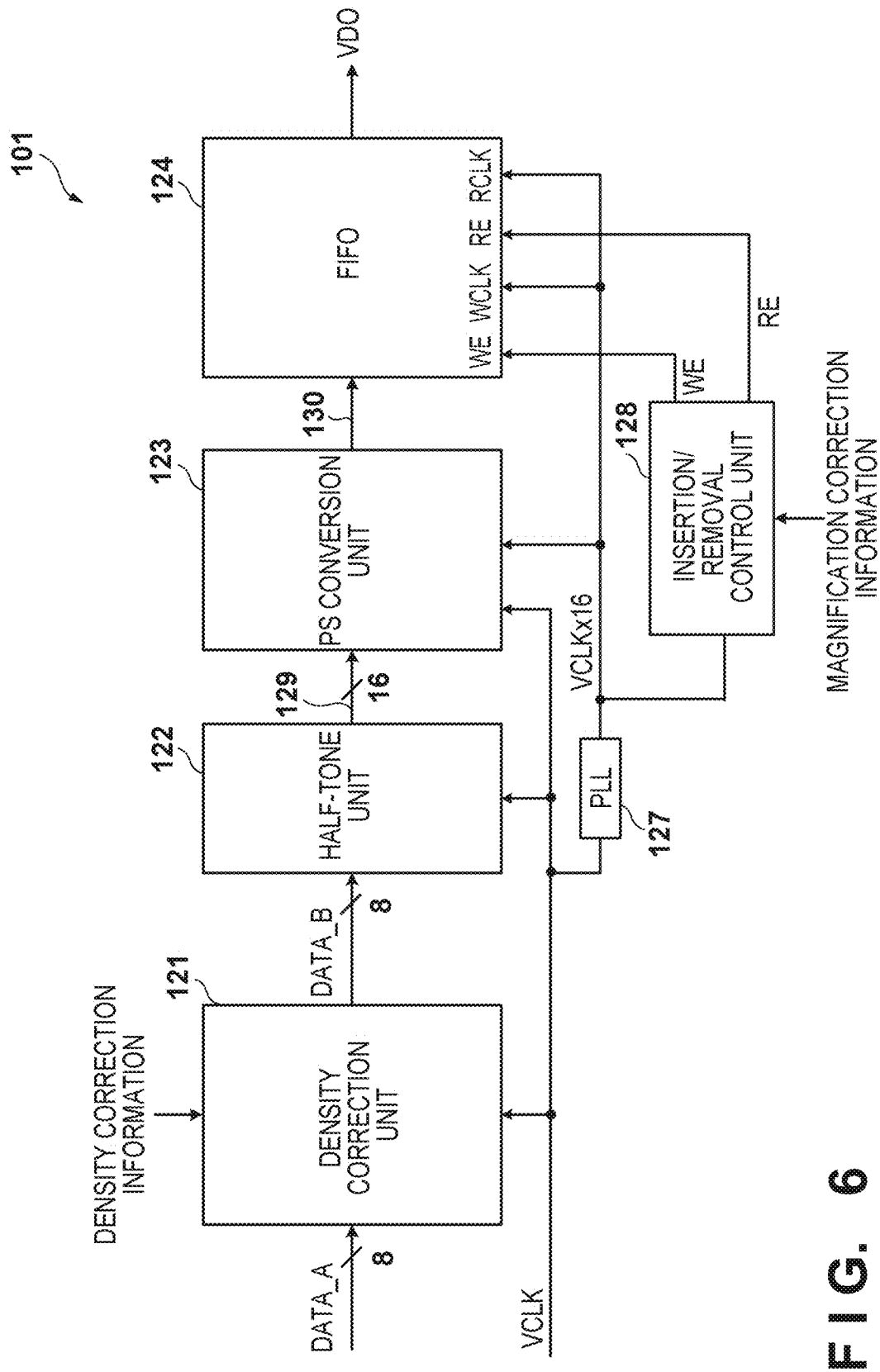
FIG. 6 is a block diagram showing an image modulation unit.

Next, with reference to FIGS. 6 to 10B, a description is given of specific processes of partial magnification correction, by which the irradiation time (exposure time) of the light source 401 per pixel in the image data is reduced according to the amount of increase in the partial magnification as the image height changes from the on-axis image height to the off-axis image height. FIG. 6 is a block diagram showing an example of the image modulation unit 101. A density correction unit 121 stores therein a density correction table (e.g., a color tone correction table) used for printing image signals, which are received from a host computer or the like, with appropriate density. A half-tone unit 122 performs screening (dithering) on eight bits of image signal that are input by the density correction unit 121 in parallel, and generates and outputs a 16-bit parallel signal 129.

Figure 7A:
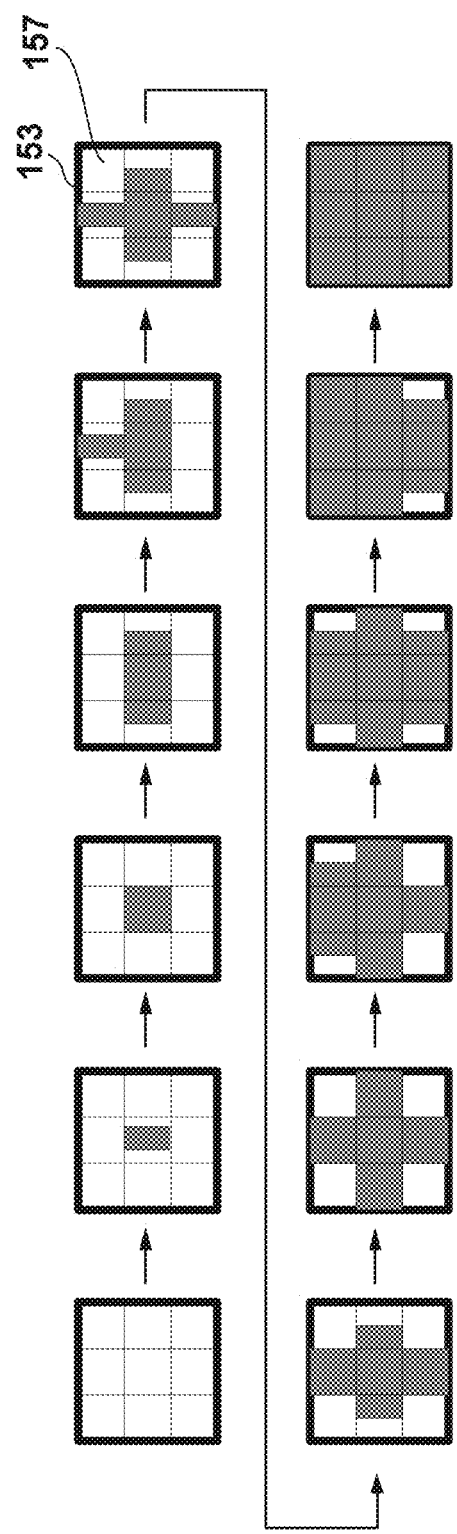
FIG. 7A is a diagram showing an example of a screen.
Figure 7B:
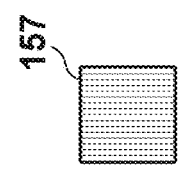
FIG. 7B is a diagram illustrating a pixel and pixel pieces.

FIG. 7A shows an example of a screen. The density of this screen is expressed with a 200-line matrix 153 having three pixels along the main scanning direction and three pixels along the sub scanning direction. In the drawing, the white part indicates the part for which the light source 401 is not turned on (OFF), and the black part indicates the part for which the light source 401 is turned on (ON). The matrix 153 is provided for each color tone. In FIG. 7A, the color tone level increases (the density increases) in the order indicated by the arrows. In the present embodiment, a single pixel 157 corresponds to one of the units that partition the image data, and forms one dot of a 600 dpi image on the scanned surface 407. As shown in FIG. 7B, a single pixel before pixel width correction is composed of pixel pieces that are smaller than a single pixel. In this example, one pixel is composed of pixel pieces each having a width that is $\frac{1}{16}$ of the width of a single pixel. In other words, one pixel is composed of 16 pixel pieces. The switch 14 turns the light source 401 ON and OFF for each of the pixel pieces according to the VDO signal. Consequently, 16 color tone levels can be expressed by a single pixel. A PS conversion unit 123 is a parallel-serial conversion unit. The PS conversion unit 123 converts a 16-bit parallel signal 129 that is input by the half-tone unit 122 into a serial signal 130, and outputs the serial signal 130 to an FIFO 124.

An insertion/removal control unit 128 and the FIFO 124 function as a width correction unit (magnification correction unit) that corrects the exposure time (scanning time) for each of the latent images respectively corresponding to pixels of the image data such that the widths of the latent images respectively corresponding to the pixels of the image data in the moving direction of the spot of the laser beam 208 are equal. First, the FIFO 124 receives the serial signal 130, and stores it in a line buffer, which is not shown in the drawings. After a predetermined period, the FIFO 124 generates the VDO signal, which is a serial signal, by reading out the serial signal 130 from the line buffer, and outputs the VDO signal to the laser drive unit 300. The read/write control for the FIFO 124 is performed by the insertion/removal control unit 128.

The insertion/removal control unit 128 controls write enable signal WE and a read enable signal RE based on magnification information that is received from the CPU 102 via the CPU bus 103. A PLL unit 127 generates a clock signal VCLK×16 by multiplying the frequency of a clock signal VCLK corresponding to a single pixel by 16, and supplies the clock signal VCLK×16 to the PS conversion unit 123 and the FIFO 124, for example. In this example, the FIFO 124 uses the clock signal VCLK×16 as a read clock signal RCLK or a write clock signal WCLK, in keeping with the read enable signal RE and write enable signal WE from insertion/removal control unit 128, respectively. Consequently, the insertion/removal control unit 128, the PS conversion unit 123, and the FIFO 124 operate for each pixel piece.

Figure 8:
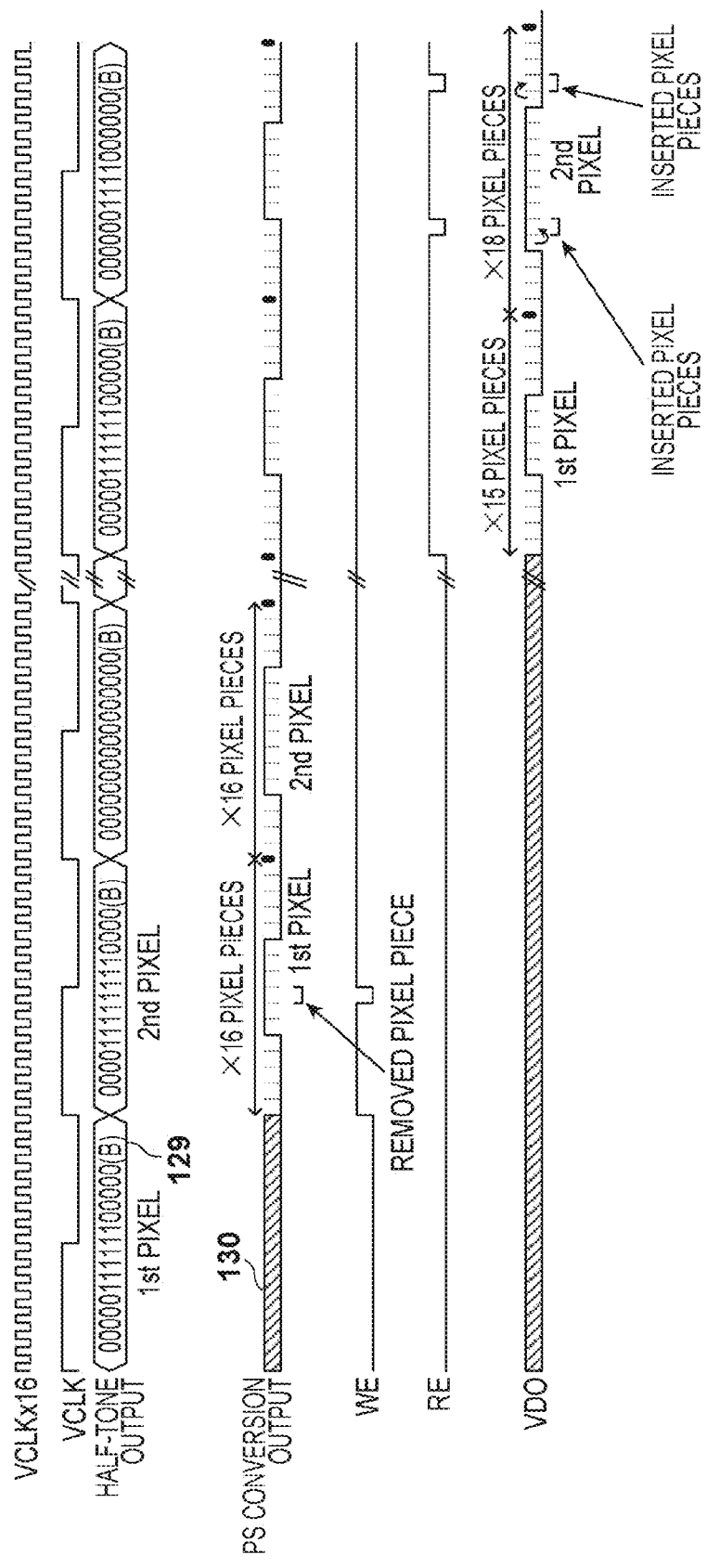
FIG. 8 is a time chart showing operation of the image modulation unit.

Next, a description is given of half-tone processing and the operations subsequent thereto, using a time chart related to operation of the image modulation unit 101 shown in FIG. 8. As described above, the PS conversion unit 123 retrieves the 16-bit parallel signal 129 from the half-tone unit 122 in synchronization with the clock signal VCLK, and transmits the serial signal 130 to the FIFO 124 in synchronization with the clock signal VCLK×16.

The FIFO 124 retrieves the serial signal 130 only when the write enable signal WE is active ("HIGH"). In the case of correcting the partial magnification (shortening the image in the main scanning direction), the insertion/removal control unit 128 sets the write enable signal WE to be inactive ("LOW") for a certain part, and thereby performs control to prevent the FIFO 124 from retrieving the serial signal 130. Consequently, only pixel pieces at desired positions are removed. FIG. 8 shows an example in which the insertion/removal control unit 128 removes one pixel piece from sixteen pixel pieces that constitute a $1^{st}$ pixel, and thus corrects the $1^{st}$ pixel to be a pixel composed of fifteen pixel pieces. In other words, the pixel width of the $1^{st}$ pixel is reduced by one pixel piece.

The FIFO 124 reads out, from the line buffer, data that has been stored therein only while the read enable signal RE is active ("HIGH"), in synchronization with the clock signal VCLK×16 ("VCLK×16"), and outputs the data as the VDO signal. In order to correct the partial magnification (to lengthen the image in the main scanning direction), the insertion/removal control unit 128 sets the read enable signal RE to be inactive ("LOW") for a certain part. Consequently, the FIFO 124 does not update the readout data, and continues outputting data corresponding to the previous clock of the clock signal VCLK×16. In other words, the same data as the data of the pixel piece that has just been processed is inserted. FIG. 8 shows an example in which the insertion/removal control unit 128 inserts two pixel pieces into sixteen pixel pieces that constitute a $2^{nd}$ pixel, and thus corrects the $2^{nd}$ pixel to be a pixel composed of eighteen pixel pieces. It is assumed that the FIFO 124 used in the present embodiment is configured such that when the read enable signal RE is set to "LOW", which indicates inactive, the output does not enter the Hi-Z state, and instead the FIFO 124 continues outputting the previous data.

Figure 9A:
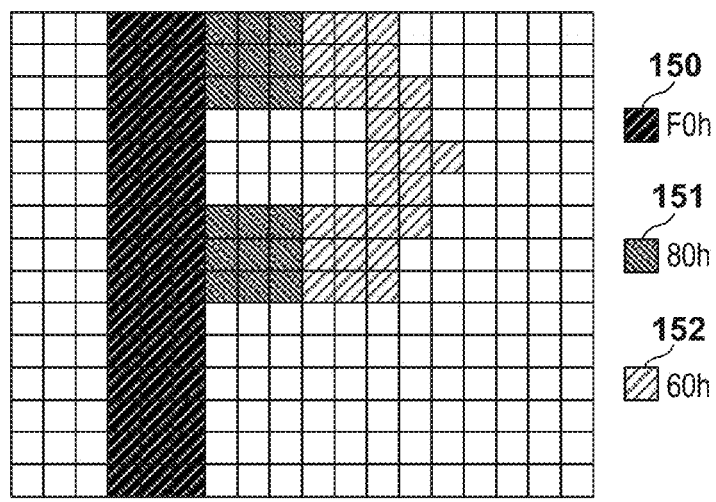
FIG. 9A is a diagram showing an example of an image signal that is input to a half-tone unit.
Figure 9B:
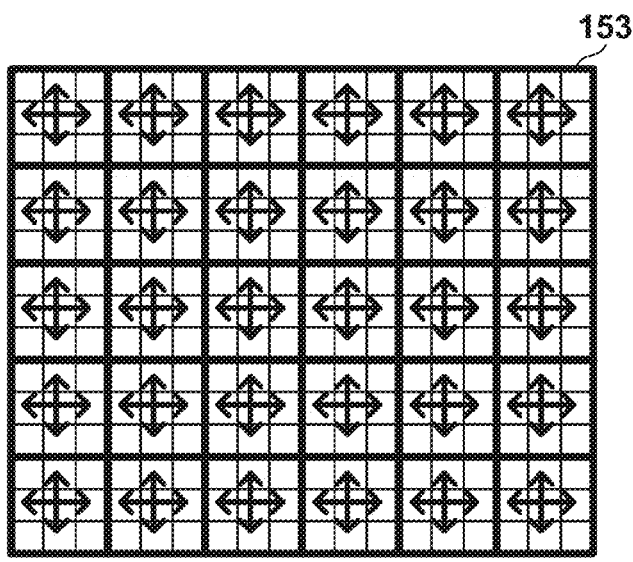
FIG. 9B is a diagram showing a screen.
Figure 9C:
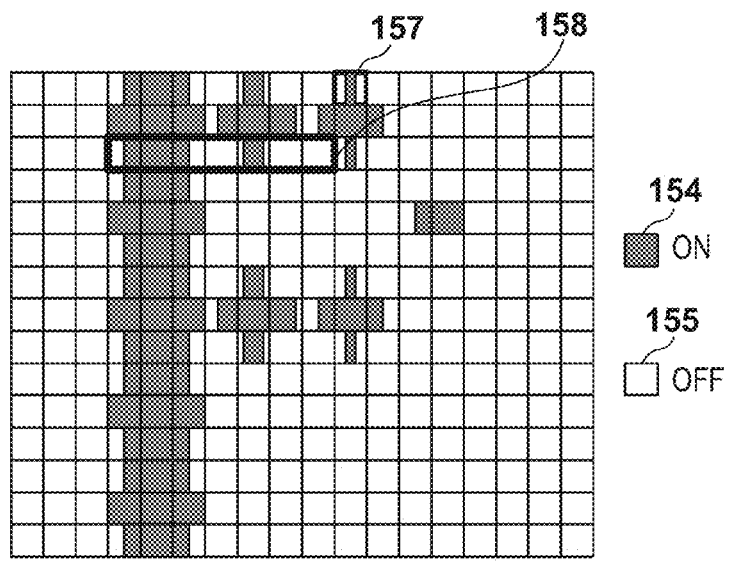
FIG. 9C is a diagram showing an example of an image signal that has undergone half-tone processing.

FIG. 9A to FIG. 9C, and FIG. 10A and FIG. 10B are diagrams illustrating the 16-bit parallel signal 129, which corresponds to the image data input by the half-tone unit 122, and the VDO signal which is output by the FIFO 124, using an example of an image. FIG. 9A shows an example of eight bits of image signal that are input to the half-tone unit 122 in parallel. Each pixel has 8-bit density information. The density of a pixel 150 is F0 h. The density of a pixel 151 is 80 h. The density of a pixel 152 is 60 h. The density of the white area is 00 h. FIG. 9B shows an example of a screen. As described for FIG. 7A, this screen is a 200-line screen in which growth starts from the center. FIG. 9C shows an example of the 16-bit parallel signal 129 as an image signal that has undergone half-tone processing. As a result of such half-tone processing, a pixel is either ON as shown at 154 or OFF as shown at 155. As described above, the pixels 157 are each composed of sixteen pixel pieces.

FIG. 10A shows an example in which, focusing attention on an area 158 shown in FIG. 9C having eight pixels arranged in the main scanning direction, a pixel piece is inserted in the serial signal 130 so that the image is expanded. FIG. 10B shows an example in which a pixel piece is removed so that the image is shortened. In FIG. 10A and FIG. 10B, "IMAGE DATA (BEFORE CORRECTION)" corresponds to the serial signal 130 output by the PS conversion unit 123. "IMAGE DATA (INSERTION POSITION)" indicates the position in the image data (before correction) in which the pixel piece is inserted. "IMAGE DATA (AFTER CORRECTION)" corresponds to the VDO signal output by the FIFO 124. In FIG. 10B, "IMAGE DATA (REMOVAL POSITION)" indicates the position in the image data (before correction) from which the pixel piece is removed.

In particular, FIG. 10A shows an example in which the partial magnification is increased by 8%. The insertion/removal control unit 128 inserts eight pixel pieces in total at equal or substantially equal intervals into one hundred successive pixel pieces. Consequently, the pixel width is changed so as to increase the partial magnification by 8%, and thus the latent image is expanded in the main scanning direction.

FIG. 10B shows an example in which the partial magnification is reduced by 7%. The insertion/removal control unit 128 removes seven pixel pieces in total at equal or substantially equal intervals from one hundred successive pixel pieces. Consequently, the pixel width is changed so as to reduce the partial magnification by 7%, and thus the latent image is shortened in the main scanning direction. In this way, with partial magnification correction, the width of a single pixel is changed in units of pixel pieces each having a length that is shorter than that of a single pixel in the main scanning direction. Consequently, dot-shaped latent images respectively corresponding to pixels of the image data can be formed at substantially equal intervals in the main scanning direction. Note that "substantially equal intervals in the main scanning direction" means that pixels are not necessarily positioned at equal intervals. In other words, the intervals between pixels may have a minor difference from each other after partial magnification correction, and it suffices if the intervals between pixels within a predetermined image height range are equal in terms of the average. Acceptable variation in the pixel intervals is determined in advance according to the product grade of the image forming apparatus 9. In the case of inserting or removing pixels at equal or substantially equal intervals as described above, the difference between the number of pixel pieces constituting one pixel and the number of pixel pieces constituting the pixel that is adjacent thereto is 0 or 1. Therefore, variation in the image density in the main scanning direction is smaller than that in the original image data, which leads to preferable image quality. The position into which a pixel piece is inserted and the position from which a pixel piece is removed may be the same or different in each scanning line (line) in the main scanning direction. Density unevenness in the sub scanning direction due to insertion or removal of pixel pieces can be reduced by shifting the position.

As described above, the scanning speed increases as the absolute value of the image height Y increases. Therefore, with partial magnification correction, pixel pieces are inserted into or removed from the image data according to the image height Y such that the image is further shortened (the length per pixel further decreases) as the absolute value of the image height Y increases. Thus, latent images respectively corresponding to pixels are formed at substantially equal intervals in the main scanning direction, and the partial magnification can be appropriately corrected.

Description of Partial Magnification Correction Operation

Figure 11:
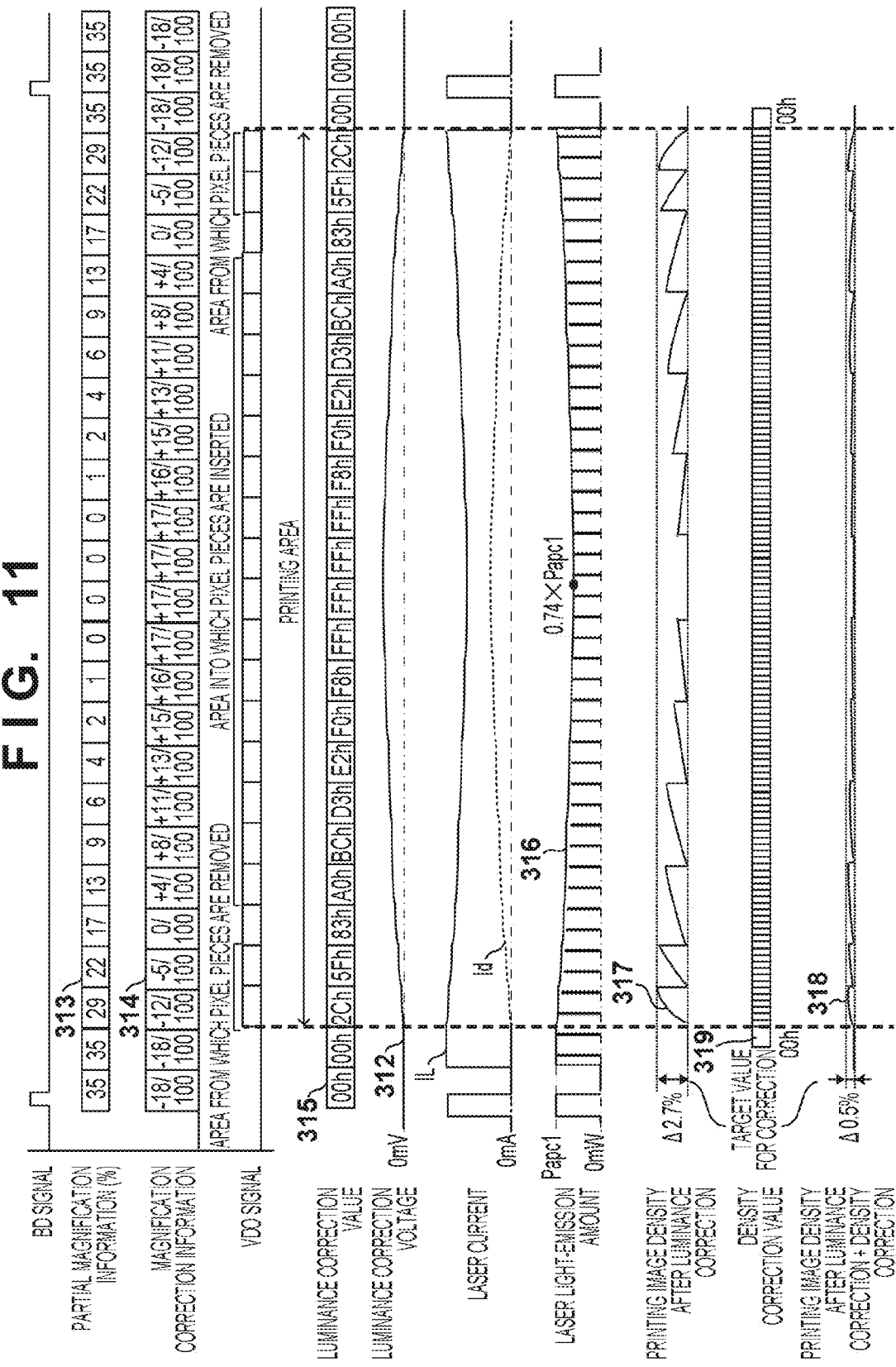
FIG. 11 is a time chart illustrating partial magnification correction and luminance correction.

FIG. 11 is a timing chart illustrating partial magnification correction, luminance correction, and density correction. Here, a description is limited to the timing related to partial magnification correction. The memory 304 stores therein magnification information 313 that indicates the partial magnification characteristics of the optical scanning device 400. The magnification information 313 may be measured and stored in the memory 304 for each individual product of the optical scanning device 400 after assembly in a factory. If there is little variation among individual products, the magnification information 313 does not need to be measured for each individual product, and representative magnification information 313 may be stored in the memory 304. The CPU core 2 reads out the magnification information 313 from the memory 304 via the serial communication line 307, and transmits the magnification information 313 to the CPU 102 in the image signal generation unit 100. The CPU 102 generates magnification correction information 314 for correcting the partial magnification based on the magnification information 313, and transmits the magnification correction information 314 to the insertion/removal control unit 128 in the image modulation unit 101. In FIG. 11, the ratio of change C of the scanning speed is 35%. This means that a partial magnification of 35% occurs at the off-axis image height relative to the on-axis image height. In the magnification correction information 314, the magnification correction value that is to be applied to the image height at which the partial magnification is 17% is set to zero. Also, the magnification correction value that is to be applied to the outermost off-axis image height is set to −18% (−18/100). Furthermore, the magnification correction value that is to be applied to the on-axis image height is set to +17% (+17/100). Therefore, as indicated by the VDO signal shown in FIG. 11, pixel pieces are removed from the image data at main scanning positions along the main scanning direction at which the absolute value of the image height is large (positions near the edges), and thus the image length is reduced near the edges. As indicated by the VDO signal, pixel pieces are inserted into the image data at main scanning positions at which the absolute value of the image height is small (positions near the center), and thus the image length is increased at the positions near the center. In order to perform correction by −18% at the outermost off-axis image height, the insertion/removal control unit 128 removes eighteen pixel pieces from the section composed of one hundred pixel pieces. Also, in order to perform correction by +17% at the on-axis image height, the insertion/removal control unit 128 inserts seventeen pixel pieces into the section composed of one hundred pixel pieces. Consequently, when compared with the partial magnification at the on-axis image height (center), the partial magnification at the positions near the outermost off-axis image height (edges) is corrected to be a partial magnification that is substantially equal to the partial magnification in the case where thirty-five pixel pieces are removed from the section composed of one hundred pixel pieces. Thus, the partial magnification is corrected by 35%. That is, regarding the moving time required for the spot of the laser beam 208 to move on the scanned surface 407 by the width of a single pixel (42.3 um (600 dpi)), the moving time at the outermost off-axis image height is corrected to be 0.74 times the moving time at the on-axis image height. This moving time may be referred to as scanning time per pixel or exposure time per pixel.

A ratio Tr of the scanning time per pixel at the outermost off-axis image height to that at the on-axis image height can be expressed by Formula (5) below, using the ratio of change C of the scanning speed.

$$Tr = 100\%/(100\% + C\%) \quad (5)$$
$$= 100\%/(100\% + 35\%)$$
$$= 0.74$$

By such insertion and removal of pixel pieces having a width that is shorter than the width of a single pixel, the pixel widths of latent images are corrected, and latent images respectively corresponding to pixels are formed at substantially equal intervals in the main scanning direction. Note that a magnification correction method by which the on-axis image height is used as the criterion and pixel pieces are not inserted into or removed from the image data at positions near the on-axis image height may be adopted. For example, the insertion/removal control unit 128 may maintain the pixel width at the on-axis image height at the criterion pixel width, and increase the proportion of the pixel pieces to be removed as the image height approaches the outermost off-axis image height. Conversely, a magnification correction method by which the outermost off-axis image height is used as the criterion and pixel pieces are not inserted into or removed from the image data at positions near the outermost off-axis image height may be adopted. The insertion/removal control unit 128 may maintain the pixel width at the outermost off-axis image height to be the criterion pixel width, and increase the proportion of the pixel pieces to be inserted, as the image height approaches the on-axis image height. However, note that favorable image quality can be achieved by performing insertion or removal of pixel pieces such that the pixel width of a pixel at an intermediate image height between the on-axis image height and the outermost off-axis image height becomes the pixel width of the criterion pixel width (the pixel width corresponding to the total width of sixteen pixel pieces). This is because the image density in the main scanning direction becomes more faithful to the image density of the original image data as the absolute value of the difference between the criterion pixel width and the pixel width of the pixel from which pixel pieces have been removed decreases.

Luminance Correction

A description is given of basic luminance correction operation with reference to FIG. 4 and FIG. 11. First, a description is given of the reason for performing luminance correction. With partial magnification correction, pixel pieces are inserted or removed such that the length per pixel decreases as the absolute value of the image height Y increases. Therefore, the total exposure amount (integrated light amount) per pixel according to the light source 401 decreases as the absolute value of the image height Y increases. That is, the correction of the luminance of the laser beam 208 is required for pixels at which the exposure amount decreases as an adverse effect of partial magnification correction. By applying luminance correction and changing the luminance of the light source 401, the total exposure amount (integrated light amount) per pixel at each image height becomes equal. That is, the image density in the main scanning direction is approximately even.

As described by using FIG. 4, the luminance correction unit is configured with the control unit 1 and the laser drive unit 300. That is, the control unit 1 and the laser drive unit 300 correct the luminance of the laser beam 208 for each of the latent images respectively corresponding to the pixels that have been subjected to width correction such that the exposure amount for each of the latent images is adjusted according to the exposure time of the corresponding latent image. In particular, the luminance of the laser beam 208 is corrected such that a larger exposure amount per unit time is set for a position at which the scanning speed is higher among exposure positions (main scanning positions, or image heights) on the photosensitive member. Consequently, the exposure amounts at the main scanning positions become equal.

The laser drive unit 300 supplies drive current to the light-emitting unit 11, which is a laser diode of the light source 401, by using the laser driver IC 16. The memory 304 stores therein luminance correction information 315 required for luminance correction and density correction information 319 required for density correction in addition to the magnification information 313. Note that the density correction information 319 is not always necessary. Density correction is performed using the density correction information 319 when it is impossible to sufficiently reduce density unevenness only with luminance correction using the luminance correction information 315. The magnification information 313 is information indicating the partial magnification at each image height in the main scanning direction. Note that characteristics information about the scanning speed in the main scanning direction may be stored instead of the magnification information. This is because the partial magnification and the scanning speed are related to each other as described above.

Next, a description is given of operation of the laser drive unit 300. The PWM generation unit 21 provided in the IC 3 of the control unit 1 generates a PWM signal for luminance correction by increasing or reducing the duty ratio according to the luminance correction information 315 stored in the memory 304. The clock generation unit 22 supplies the fundamental frequency (a fundamental clock signal) to the PWM generation unit 21. The IC 3 outputs the PWM signal to the laser drive unit 300 in synchronization with the BD signal. The filter circuit 305 of the laser drive unit 300 generates a DC voltage (hereinafter referred to as a luminance correction voltage) 312 by smoothing the PWM signal according to a cutoff frequency that has been set in advance. The V-to-I conversion unit 306 converts the luminance correction voltage 312 to a current Id, and outputs the current Id to the laser driver IC 16.

Figure 12:
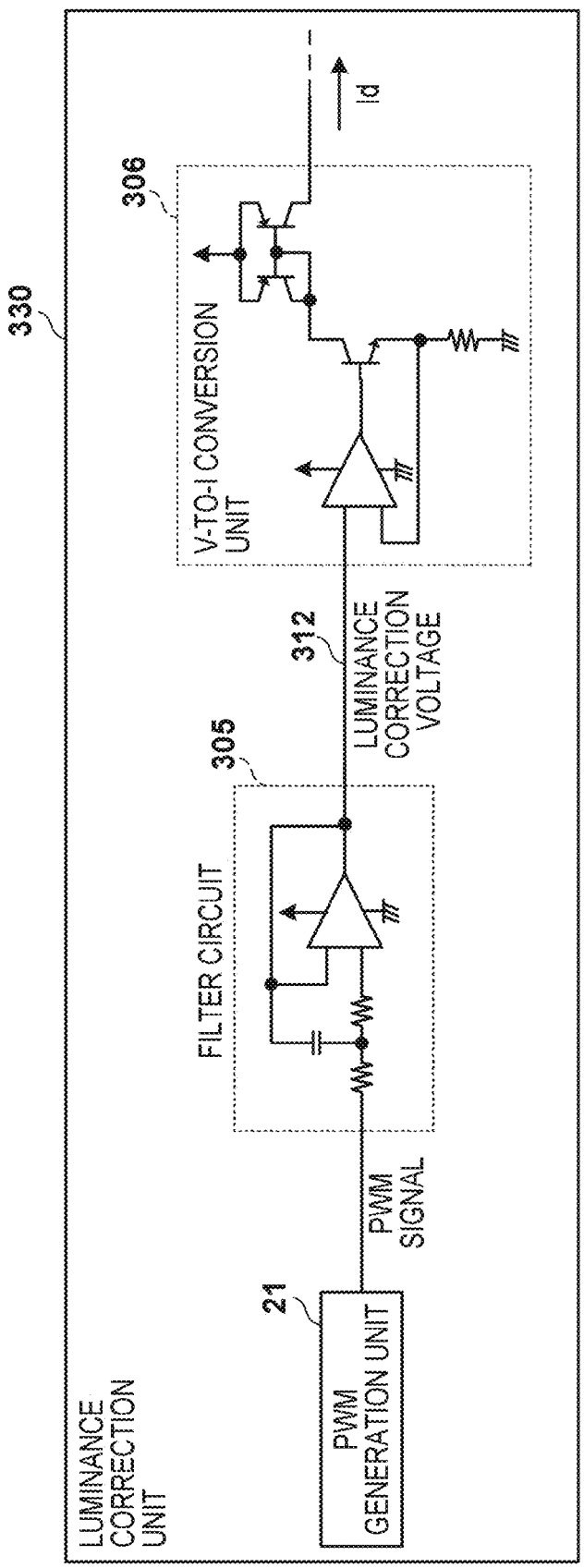
FIG. 12 is a block diagram showing a luminance correction unit.

A description is given of a luminance correction unit 330 with reference to FIG. 12. The luminance correction unit 330 is configured with, for example, the PWM generation unit 21, the V-to-I conversion unit 306, and so on. That is, a luminance correction unit can be configured with the PWM generation unit 21, the filter circuit 305, and the V-to-I conversion unit 306. The filter circuit 305 is optional, and smooths the PWM signal output by the PWM generation unit 21 so that the luminance correction voltage 312 smoothly changes. The filter circuit 305 can be configured with an active filter circuit that utilizes an operational amplifier. The filter circuit 305 removes a frequency component from the PWM signal and thus the PWM signal is smoothed. The frequency component of the PWM signal is cut off according to the cutoff frequency of the filter circuit 305. Since the filter circuit 305 is provided, changes in the amount of the laser beam 208 that correspond to switching of the PWM signal between the high level and the low level become moderate, and line noise and density unevenness on images is reduced.

The laser driver IC 16 controls the switch 14 according to the VDO signal, and switches between whether to supply a current IL to the light-emitting unit 11 or to the dummy resistor 10. Consequently, turning on (ON)/turning off (OFF) of the light-emitting unit of the light source 401 is controlled. The current IL (a third current) supplied to the light-emitting unit 11 is the current resulting from subtracting a current Id (a second current) that is output from the V-to-I conversion unit 306 from a current Ia (a first current) that has been set by the constant current circuit 15. In order to monitor the amount of light from the light-emitting unit 11, the light source 401 is provided with the photodetector 12. The laser driver IC 16 adjusts the current Ia that flows through the constant current circuit 15 such that the luminance detected by the photodetector 12 equals a desired luminance Papc1. This adjustment is known as APC (Automatic Power Control). The variable resistor 13 is adjusted at the time of assembly in a factory such that the light-emitting unit 11 emits light with a predetermined luminance.

As described above, the current IL resulting from subtracting the current Id, which is output by the V-to-I conversion unit 306, from the current Ia, which is required for emitting light with the desired luminance, is supplied to the light-emitting unit 11. With this configuration, the current IL for driving the laser is controlled so as not to be greater than or equal to the current Ia. Note that the V-to-I conversion unit 306 constitutes a part of the luminance correction unit.

Figure 13:
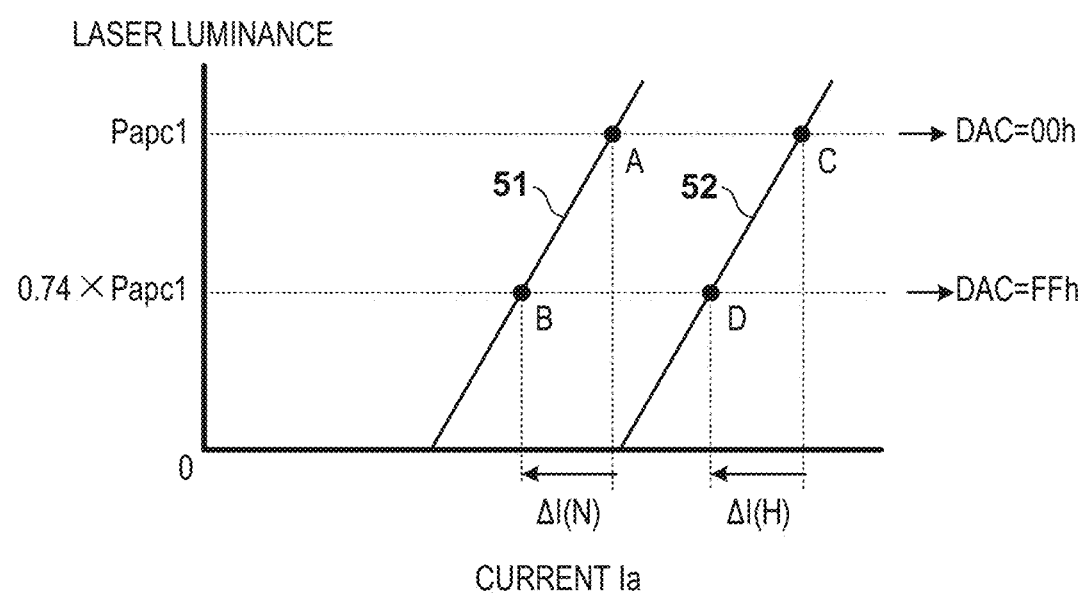
FIG. 13 is a graph showing current-and-luminance characteristics of a light-emitting unit.

FIG. 13 is a graph showing the current-and-luminance characteristics of the light-emitting unit 11. The current Ia required for causing the light-emitting unit 11 to emit light with the predetermined luminance changes depending on the ambient temperature around the light-emitting unit 11. In FIG. 13, a graph 51 shows the current-and-luminance characteristics in a standard temperature (25° C.) environment. A graph 52 shows the current-and-luminance characteristics in a high temperature (30° C.) environment. Usually, the current Ia required for causing a laser diode to output light with the predetermined luminance changes as the environmental temperature changes. However, there is almost no change in the efficiency of the laser diode (the respective slopes of the graphs 51 and 52). That is, in order to cause the laser diode to emit light with the predetermined luminance Papcl in the standard temperature environment, the current value indicated by a point A is required as the current Ia. In the high temperature environment, the current value indicated by a point C is required as the current Ia. As described above, even when the environmental temperature changes, the laser driver IC 16 adjusts the current Ia to be supplied to the light-emitting unit 11 to have the predetermined luminance Papcl by monitoring the luminance of the light-emitting unit 11 by using the photodetector 12. There is almost no change in the efficiency regardless of changes in the environmental temperature. The laser driver IC 16 reduces the luminance to 0.74 times the predetermined luminance Papcl by subtracting a predetermined current $\Delta I(N)$ or $\Delta I(H)$ from the current Ia required for emitting light with the predetermined luminance Papcl. Note that a sensor for measuring the environmental temperature may be built into the laser driver IC 16 or externally provided. Also, depending on the environmental temperature, the predetermined current $\Delta I(N)$ or $\Delta I(H)$ may be stored in the memory 304. Since there is almost no change in the efficiency regardless of changes in the environmental temperature, the predetermined currents $\Delta I(N)$ and $\Delta I(H)$ are almost the same. Therefore, it suffices if at least one of the predetermined currents $\Delta I(N)$ and $\Delta I(H)$ is stored in the memory 304. In the present embodiment, the luminance of the light-emitting unit 11 is gradually increased as the scanning position moves from the center (corresponding to the on-axis image height) to the edges (corresponding to the outermost off-axis image height). At the center, the light-emitting unit 11 emits light with the luminance indicated by a point B or a point D shown in FIG. 13, and at the edges, the light-emitting unit 11 emits light with the luminance indicated by a point A or a point C. These points may be obtained by suitable input to a digital-to-analog converter (DAC), such as by input of DAC=00 h for points A and C or by input of DAC=FFh for points B and D.

Luminance correction is performed by subtracting the current Id corresponding to the predetermined current $\Delta I(N)$ or $\Delta I(H)$ from the current Ia that has been adjusted such that the light-emitting unit 11 emits light with the desired luminance. As described above, the scanning speed increases as the absolute value of the image height Y increases. The total exposure amount (integrated light amount) per pixel decreases as the absolute value of the image height Y increases. Therefore, by luminance correction, the luminance is corrected such that the luminance increases as the absolute value of the image height Y increases. Specifically, the CPU core 2 sets the current Id via the PWM signal such that the current Id decreases as the absolute value of the image height Y increases, and consequently the current IL increases as the absolute value of the image height Y increases. Thus, the partial magnification is corrected, and also the lack of exposure amount due to partial magnification correction is reduced.

So far, a description has been given of the case where the CPU core 2 corrects the luminance of the light-emitting unit 11 by increasing or reducing the duty ratio of the PWM signal according to the luminance correction information 315. However, a regulator that generates voltage may be provided instead, and the regulator may increase or reduce the analogue voltage from a DA converter according to the luminance correction information 315.

Density Correction

Luminance correction reduces density unevenness in the main scanning direction caused by partial magnification correction. However, there may be cases where density unevenness cannot be sufficiently reduced by luminance correction alone. Considering the above, a description is given of density correction for further reducing density unevenness.

Figure 14:
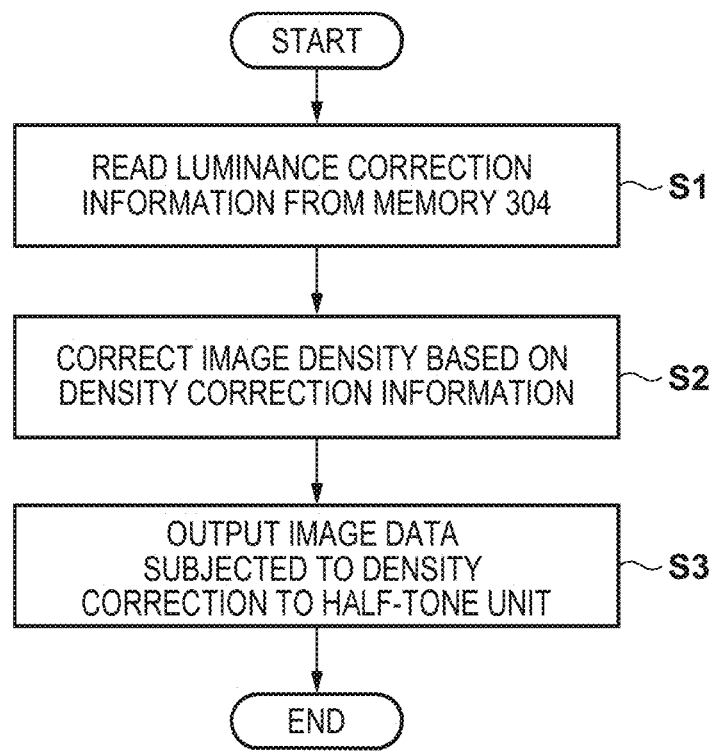
FIG. 14 is a flowchart showing density correction.

FIG. 14 is a flowchart showing density correction processing according to the present embodiment. Density correction processing is performed by the image modulation unit 101 shown in FIG. 4. In particular, the density correction unit 121 functions as a density correction unit that corrects the density value of each pixel so as to reduce level differences in the image density caused by the correction of the luminance of the laser beam 208 by luminance correction.

In step S1, the density correction unit 121 of the image modulation unit 101 reads out the density correction information 319 from the memory 304 via the CPU 102 and the control unit 1. The CPU 102 transmits a request to read out the density correction information 319, to the CPU core 2 via the serial communication line 307. Upon receiving the request to read out the density correction information 319, the CPU core 2 reads out the density correction information 319 from the memory 304 via the serial communication line 113, and transmits the density correction information 319 to the CPU 102 via the serial communication line 307. The CPU 102 sets the density correction information 319 thus received for the density correction unit 121. In other words, the density correction information 319 is ultimately stored in the internal buffer of the density correction unit 121 as a density correction value. Note that the IC 3 of the control unit 1 generates a luminance correction value based on the luminance correction information 315, and sets the luminance correction value for the PWM generation unit 21. In the density correction information 319, a change amount (a density correction value) has been set in advance, which is required for further improving image density evenness in the main scanning direction, upon the result of luminance correction. The luminance correction information 315 and the density correction information 319 is measured and stored in the memory 304 for each individual product of the image forming apparatus 9 at the time of manufacturing, or is obtained and stored in the memory 304 as information shared among a plurality of individual products.

In step S2, the density correction unit 121 performs density correction on image data based on the density correction value stored in the buffer. For example, as shown in FIG. 11, the density correction unit 121 reads out the density correction value from the buffer in synchronization with the BD signal, and corrects the image density (the density values, the color tone values, and the like) of the image data such that the total exposure amount per unit length becomes appropriate at each image height. Consequently, an even image density in the main scanning direction can be obtained.

In step S3, the density correction unit 121 outputs the image data that has undergone density correction to the half-tone unit 122. The half-tone unit 122 performs half-tone processing, which has been described with reference to FIGS. 9A to 9C and so on, on the image data that has been input by the density correction unit 121.

Due to such density correction, density unevenness that has not been sufficiently reduced by luminance correction can be reduced. That is, image density evenness from the on-axis image height to the off-axis image height is achieved. Note that the image density in the present embodiment is the value of each pixel obtained by measuring the toner density (optical density) of the image after printing.

Description of Luminance Correction Operation and Density Correction Operation

In the present embodiment, a description is given of the method for performing luminance correction and density correction in addition to partial magnification correction with reference to FIG. 4, FIG. 11, and so on. As described above, luminance correction is combined with partial magnification correction. However, density correction may be combined with partial magnification correction instead of luminance correction. The combination of luminance correction and density correction with partial magnification is advantageous for further reducing density unevenness.

As shown in FIG. 11, the printing area is divided into a plurality of areas arranged along the main scanning direction. The CPU core 2 sets, for each area, a luminance correction value that corresponds to the luminance correction information 315, that is, the duty ratio of the PWM signal output from the PWM generation unit 21. In FIG. 11, the luminance correction value for the on-axis image height is FFh, and the luminance correction value for the outermost off-axis image height is 00 h. The luminance correction information 315 has been created such that the luminance correction value decreases as the absolute value of the image height Y increases. The luminance correction voltage 312, which is obtained by smoothing the PWM signal generated based on the luminance correction value, has the same relationship. Consequently, as the absolute value of the image height Y increases, the current Id output from the VI conversion unit 306 decreases, and conversely, the current IL increases. As a result, a laser light-emission amount 316 of the laser beam 208 output by the light-emitting unit 11 is Papc1 at the outermost off-axis image height, and is corrected to be 0.74 times Papc1 at the on-axis image height. In other words, an attenuation ratio R of the luminance is 26%. That is, the luminance at the outermost off-axis image height is 1.35 times the luminance at the on-axis image height. Note that the attenuation ratio R % can be expressed by Formula (6) below, using the ratio of change C of the scanning speed.

$$R = (C/(100+C)) \times 100 \quad (6)$$
$$= 35\%/(100\% + 35\%) \times 100$$
$$= 26\%$$

The luminance correction value and the attenuation ratio R of the luminance have a proportional relationship. It is assumed here that the relationship between the attenuation ratio R and the luminance correction value is set such that the luminance is attenuated by 26% when the luminance correction value is FFh. In this case, the luminance is attenuated by 13% when the luminance correction value is 80 h. Such adjustment of the luminance correction value relative to the attenuation ratio R of the luminance can be easily realized by changing the circuit constant for the V-to-I conversion unit 306.

Next, a description is given of an example of the specifications of the frequency of the PWM signal and a method for setting the duty ratio. It is assumed here that the BD period of the image forming apparatus 9 is 600 μs, the width of the printing area is 200 μs, and an eight-bit PWM signal is used. The cutoff frequency of the filter circuit 305 that smooths the PWM signal is set such that the luminance correction voltage 312 after smoothing has the maximum possible linearity in each of the divisional areas constituting the printing area. If the cutoff frequency determined by the circuit constant of the filter circuit 305 is inappropriate, or if the number of divisional areas is too large, a problem may arise. For example, the linearity of the luminance correction voltage 312 relative to the duty ratio of the PWM signal cannot be obtained. Conversely, if the number of divisional areas is too small, the resolution of luminance correction in the main scanning direction inevitably becomes low. Also, the difference between the luminance correction values of adjacent divisional areas becomes large, and the density unevenness of the image density becomes noticeable.

Here, the number of pulses of the PWM signal for each divisional area is set to 5 based on experience. As shown in FIG. 3, the relationship between the image height and the partial magnification gradually changes from the on-axis image height at the center to the outermost off-axis image height on both sides. Therefore, the printing area may be divided into the same number of areas on both sides of the on-axis image height at the center. Depending on the characteristics of the image forming apparatus 9 and the accuracy required for the image density, there are cases where the level difference between the image densities of two adjacent divisional areas needs to be smaller than or equal to 0.5%. If an attempt is made to satisfy this condition by luminance correction alone, the fundamental frequency generated by the clock generation unit 22 needs to be higher than or equal to 768 MHz, the communication frequency of the PWM signal needs to be higher than or equal to 3 MHz, and the number of divisional areas needs to be larger than or equal to 120. The manufacturing costs of ICs that satisfy such conditions tend to be high. Also, ICs operating at a high frequency may become the source of radiation noise, or become susceptible to disturbance. In other words, there is the possibility of degradation in the design flexibility of the hardware and the software of the image forming apparatus 9. Therefore, it is advantageous to perform density correction in addition to luminance correction in order to ensure that the resolution for luminance correction in the main scanning direction and the hardware specifications regarding luminance correction are reasonable and unlikely to have an adverse effect. That is, application of density correction in addition to luminance correction reduces the manufacturing cost of the IC 3, reduces radiation noise, and reduces the influence of disturbance on the IC 3.

As settings for luminance correction that are unlikely to have an adverse effect, the following specifications may be conceived of, for example. In the present embodiment, the level difference (density difference) between the image densities of adjacent divisional areas is reduced to approximately 2.7% at maximum by luminance correction, and the density level difference is further reduced to be smaller than or equal to 0.5% by density correction. For example, it is assumed that the fundamental frequency of the PWM signal is 128 MHz, the communication frequency of the PWM signal is 500 kHz, and the number of divisional areas is 22. In FIG. 11, the number of pieces of magnification information 313 and the number of divisional areas of the VDO signal within the printing area are the same. However, they are not necessarily required to be the same.

In FIG. 11, the density difference Δ of an image density 317 from the target value for correction, resulting from luminance correction alone, is smaller than or equal to 2.7%. Therefore, density correction is necessary to further reduce the density difference Δ to be smaller than or equal to 0.5%. Regarding the image density of the densest image that can be formed by the image forming apparatus 9, only the image density can be reduced with density correction. Therefore, luminance correction is designed such that the criterion value for density correction is the maximum image density. That is, if the density difference Δ resulting from luminance correction is 2.7%, this means that the difference between the upper limit value of the image density and the lower limit value of the image density is 2.7%. Therefore, the lower limit value of the image density is set to the maximum image density.

In the present embodiment, 00 h is used as the criterion value for the density correction, i.e., the value at which density correction is not performed. The density correction value falls within the range of 00 h to FFh. The density is corrected to be reduced. Values other than 00 h may be set as the criterion value for density correction. However, in order to maximize the correction range, 00 h is set as the criterion value.

As shown in FIG. 11, in order to perform density correction, the printing area is divided into a plurality of areas arranged along the main scanning direction, in a similar manner as for luminance correction. The density correction value for each divisional area is included in the density correction information 319. The number of divisional areas for density correction may be larger than the number of divisional areas for luminance correction. That is, the resolution of density correction in the main scanning direction may be increased from the resolution of luminance correction. Consequently, the capability of density correction is improved, and accordingly image density evenness in the main scanning direction can be further improved. Here, the number of divisional areas for density correction within the printing area is set to 132. In other words, the resolution of density correction is set to six times the resolution of luminance correction. Areas outside the printing area, near the outermost off-axis image height, are the areas for which the density is not to be changed. The density correction value for these areas is set to 00 h. The density correction values for the other areas are set to a value within the range of 00 h to FFh such that the image density is reduced by up to 2.7%.

Figures 15A, 15B:
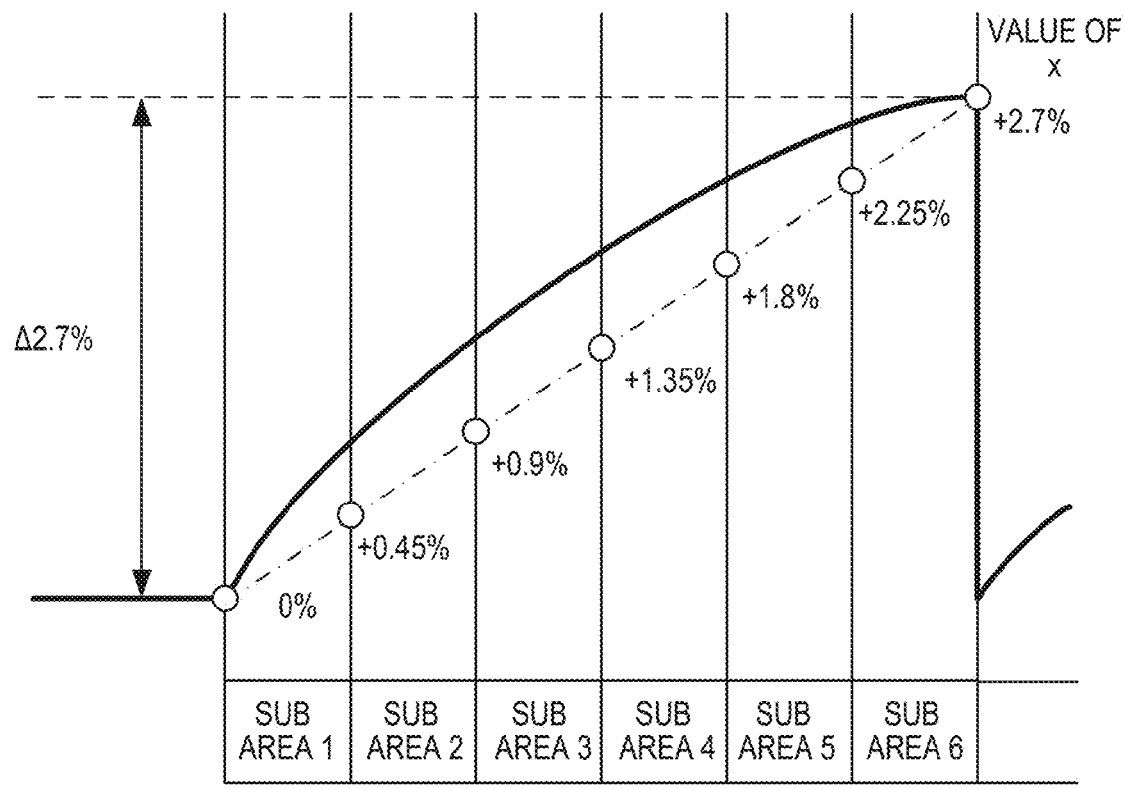
FIG. 15A is a diagram illustrating areas for density correction.
FIG. 15B is a table illustrating a density correction value.

FIG. 15A shows an area at the outermost off-axis image height within the printing area shown in FIG. 11. As shown in FIG. 15A, the density difference Δ of this area is 2.7%. As shown in FIG. 15A, each area for density correction is further divided into six sub areas. The image density is approximated by linear interpolation such that the density difference Δ of each sub area is smaller than or equal to 0.5%. Due to luminance correction, the image densities of sub areas 1 to 6 respectively change by +0.45%, +0.9%, +1.35%, +1.8%, +2.25%, and +2.7%. Each of these values is a density correction value x for the corresponding sub area.

The table shown in FIG. 15B indicates, for the sub areas 3 and 6 shown in FIG. 15A, the value of image data DATA_B that is output in response to image data DATA_A that is input to the density correction unit 121. Examples of the value of DATA_A are 00 h, 40 h, 80 h, C0 h, and FFh. Regarding the sub area 3, the value of DATA_B is 98.65% of the value of DATA_A such that the image density of the sub area 3 is reduced by 1.35%. Regarding the sub area 6, the value of DATA_B is 97.3% of the value of DATA_A such that the image density of the sub area 6 is reduced by 2.7%. Formula (7) for calculating DATA_B from DATA_A is as follows.

$$DATA\_B = DATA\_A \times (100-x)/100 \qquad (7)$$

Note that the density correction unit 121 may be a computing unit or a lookup table configured with a memory or the like.

The results of such luminance correction and density correction are shown at the bottom of FIG. 11. An image density 318 differs from the target value for correction by Δ0.5% or less, and thus it is possible to obtain an image density that is approximately even in the main scanning direction.

As described above, in the present embodiment, partial magnification correction and luminance correction for changing the laser beam in the main scanning are adopted. Consequently, it becomes possible to form an image with an approximately constant partial magnification and reduced density unevenness without using a scanning lens having the fθ characteristics. Furthermore, density correction for correcting the image density of the image data may also be adopted. Consequently, density unevenness (density level difference) that cannot be reduced by luminance correction alone can be reduced. In particular, the capability of luminance correction is improved by setting the resolution of density correction to be higher than the resolution of luminance correction with respect to the main scanning direction, and thus density unevenness of the image can be more efficiently reduced. Although partial magnification correction by insertion and removal of pixel pieces is adopted in the present embodiment, a configuration disclosed in Japanese Patent Laid-Open No. S58-125064 may be adopted. For example, the partial magnification may be corrected by providing a clock generation unit that can output a clock signal at a plurality of different frequencies, and changing the clock frequency according to the position in the main scanning direction.

With luminance correction according to the present embodiment, luminance is controlled such that the exposure amount per unit time, which is obtained from the combination of the light-emission luminance of the laser beam and the time light is turned ON, is increased at the edges of the printing area, at which the scanning speed is higher than at the center thereof. Due to such luminance correction, the exposure amount per unit area of the surface of the photosensitive drum 4 becomes almost constant independent from the main scanning position, and the image density becomes uniform.

In the present embodiment, half-tone processing is performed after density correction, and then luminance correction is applied. Therefore, the exposure amount per unit time that corresponds to three dots in the main scanning direction and three dots in the sub scanning direction is increased as the scanning speed increases. Due to such luminance correction and density correction, the exposure amount per unit area of the photosensitive drum 4 becomes constant. In the present embodiment, three dots in the main scanning direction and three dots in the sub scanning direction are considered as a unit of dots on which correction is performed. However, the number of dots in the main scanning direction and the sub scanning direction may be a different number.

Figure 16:
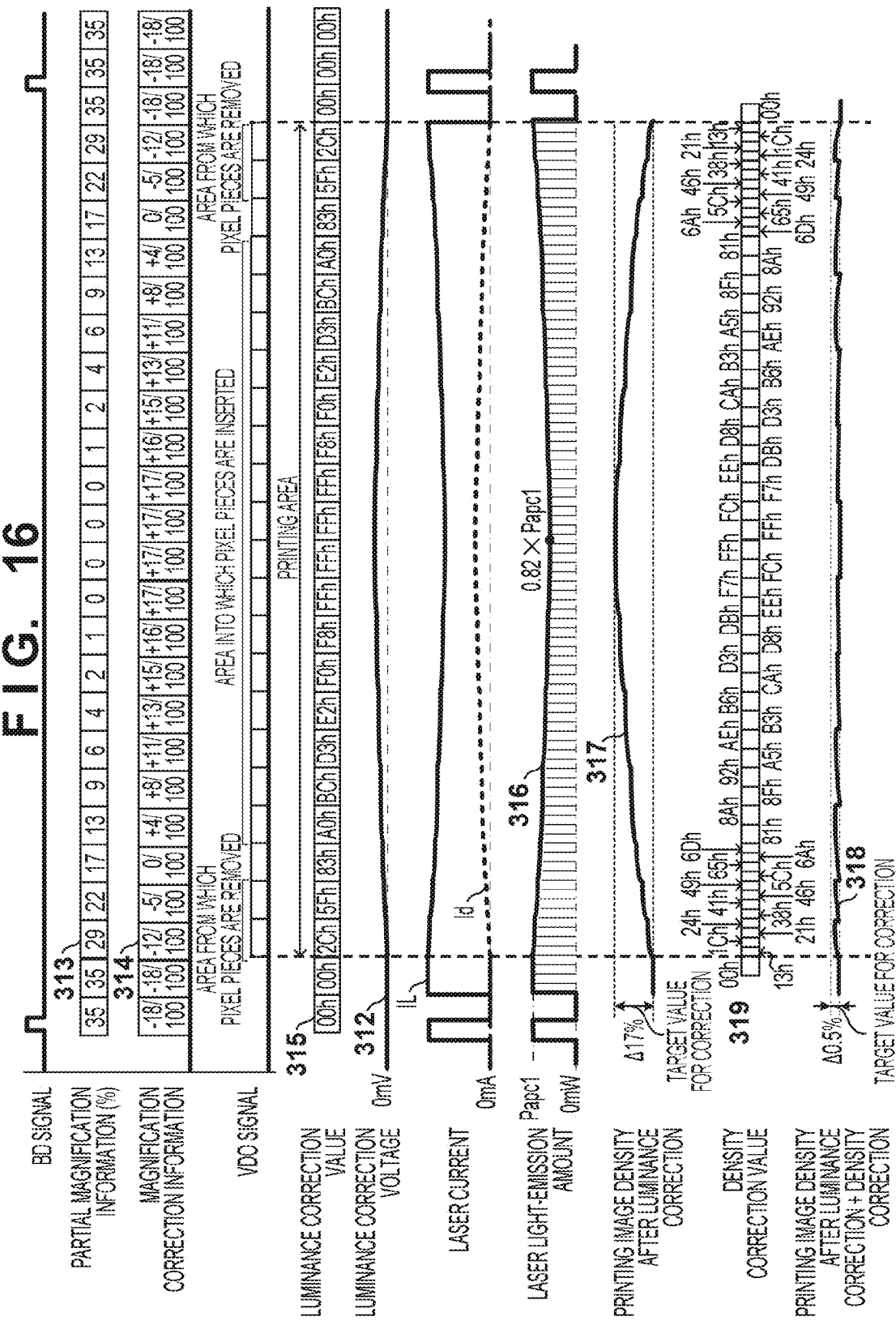
FIG. 16 is a time chart illustrating partial magnification correction and luminance correction.

A description is given of Embodiment 2 with reference to FIG. 16. As with the first embodiment, the second embodiment relates to a method for performing luminance correction and density correction in addition to partial magnification correction. In the first embodiment, a description was given of the advantage of the resolution of the density correction unit with respect to the main scanning direction being set higher than the resolution of the luminance correction unit with respect to the main scanning direction. In the second embodiment, a description is given of the advantage of the resolution of the density correction unit with respect to the exposure amount per unit time also being set higher than the resolution of the luminance correction unit. Due to this configuration, the second embodiment can achieve an effect that is greater than or equal to the effect of the first embodiment. The fundamental correction methods of partial magnification correction, luminance correction, and the density correction in the second embodiment are the same as those in the first embodiment. In the second embodiment, elements that are the same as those in the first embodiment are given the same reference signs in order to simplify the description thereof.

Luminance Correction

First, a description is given of luminance correction according to the second embodiment. The luminance correction method per se is the same in the first embodiment and in the second embodiment. However, the luminance correction value has been changed. As shown in FIG. 16, the printing area is divided into a plurality of areas arranged along the main scanning direction, and a luminance correction value, i.e., the duty ratio of the PWM signal, is set for each area. As in the first embodiment, it is assumed that the fundamental frequency of the PWM signal is 128 MHz, the communication frequency of the PWM signal is 500 kHz, and the total number of divisional areas within the printing area is 22. It is also assumed that in the luminance correction information 315 for the printing area, the luminance correction value for the on-axis image height is FFh and the luminance correction value for the outermost off-axis image height is 00 h. That is, the luminance correction information 315 has been set in advance such that the luminance correction value decreases as the absolute value of the image height Y increases, and is stored in the memory 304. It is also assumed that the circuit constant of the V-to-I conversion unit 306 has been adjusted such that the luminance is attenuated by 18% when the luminance correction value is FFh. If this is the case, the light-emitting unit 11 emits light with the luminance Papc1 at the outermost off-axis image height, and emits light with 0.82 times the luminance Papc1 at the on-axis image height, according to the duty ratio of the PWM signal (the luminance correction value). That is, the luminance at the outermost off-axis image height is 1.22 times the luminance at the on-axis image height. The relationship between the attenuation ratio R % and the ratio of change C' of the luminance can be expressed by Formula (8) below.

$$R = (C'/(100+C')) \times 100 \qquad (8)$$

Therefore, when R=18% is satisfied, C'=22% can be obtained. Here, the resolution per LSB (corresponding to the minimum unit for measuring the luminance correction value) of the luminance correction unit with respect to the exposure amount per unit time can be obtained based on Formula (9) below.

$$(18\% \div FFh) \times 100 = (18\% \div 255) \times 100 \approx 0.071 \quad (9)$$

In FIG. 16, the image density 317 indicates the image density that is obtained by using luminance correction alone. If the laser driver IC 16 controls the laser current IL such that the printing image density at the outermost off-axis image height is its target value for correction, the image density at the on-axis image height and its target value for correction differ by 17%. Unlike in the first embodiment, the image density 317 after luminance correction according to the second embodiment is characterized by gradually decreasing in the direction from the on-axis image height at the center to the outermost off-axis image height.

Density Correction

Next, a description is given of density correction according to the second embodiment. The density correction values included in the density correction information 319 are respectively allocated to the plurality of divisional areas arranged along the main scanning direction. As shown in FIG. 16, near the on-axis image height, the number of divisional areas for density correction is set to be twice the number of divisional areas for luminance correction. Also, near the outermost off-axis image height, the number of divisional areas for density correction is set to be four times the number of divisional areas for luminance correction. That is, the resolution of the density correction unit is set to be higher than the resolution of the luminance correction unit with respect to the main scanning direction. Here, the number of divisional areas for density correction within the printing area is set to 56. The image density of each divisional area is corrected by density correction such that image density unevenness within the printing area becomes smaller than or equal to 0.5%. Here, it is assumed that the density correction value has been set in advance as follows. When the density correction value is set to the minimum value 00 h, the image density remains 100%, i.e., the image density is not corrected. When the density correction value is set to the maximum value FFh, the image density is reduced by 17%. The image densities of divisional areas near the on-axis image height need to be reduced, and therefore the density correction value for these areas is set to FFh. The image densities of the divisional areas near the outermost off-axis image height do not need to be changed, and therefore the density correction value for these areas is set to 00 h. For each of the other divisional areas, a graduated density correction value is set so as to minimize the level difference among the image densities after correction. Here, the resolution (per LSB) of the density correction unit with respect to the exposure amount per unit time is calculated based on Formula (10) below.

$$(17\% \div FFh) \times 100 = (17\% \div 255) \times 100 \approx 0.066 \quad (10)$$

As can be seen from a comparison between Formula (9) and Formula (10), in the second embodiment, the resolution of the density correction unit with respect to the exposure amount per unit time is set to be higher than the resolution of the luminance correction unit with respect to the exposure amount per unit time. As shown in FIG. 16, after density correction is performed in addition to luminance correction, the variation in the image density 318 from the target value for correction is reduced to be less than or equal to 0.5%.

Thus, it is possible to obtain an image density that is approximately even in the main scanning direction.

As described above, the partial magnification correction, luminance correction, and density correction are adopted in the present embodiment. In particular, the resolution of the density correction unit is set to be higher than the resolution of the luminance correction unit with respect to the main scanning direction, and also the resolution of the density correction unit with respect to the exposure amount per unit time is set to be higher than the resolution for luminance correction. Consequently, it becomes possible to form an image with less image failure without using a scanning lens having the fθ characteristics. Other advantageous effects and possible modifications of the second embodiment are the same as those of the first embodiment.

A third embodiment provides a description of another example of a density correction method. In the first embodiment, the image density is changed by the density correction unit 121 directly changing the image data. It is assumed that partial magnification correction and luminance correction in the third embodiment are the same as those in the second embodiment. As a matter of course, partial magnification correction and luminance correction described in the first embodiment is applicable to the third embodiment as well. In the third embodiment, elements that are the same as those in the second embodiment are given the same reference signs in order to simplify the description thereof.

In the third embodiment, unlike in the first and the second embodiment in which the density values (the color tone values) are directly corrected, the image density is corrected by performing force-OFF, which is the processing of forcibly turning the light source 401 off for each pixel at a high resolution (in units of pixel pieces each having a width that is shorter than the width of a single pixel).

FIG. 17 is a block diagram showing an example of the image modulation unit 101. In the third embodiment, instead of the density correction unit 121, a force-OFF unit 133 that forcibly turns the light source 401 off is provided between the half-tone unit 122 and the PS conversion unit 123. As with the density correction unit 121, the force-OFF unit 133 functions as a density correction unit that corrects the printing image density. The force-OFF unit 133 applies force-OFF to the 16-bit parallel signal 129 that is output by the half-tone unit 122, and outputs a 16-bit parallel signal 134 to the PS conversion unit 123.

Figure 18:
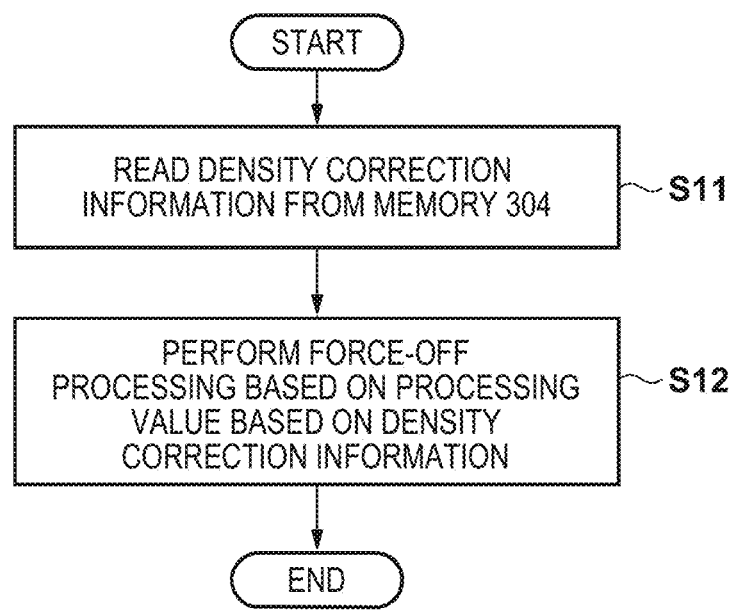
FIG. 18 is a flowchart showing density correction by force-OFF.

Next, a description is given of force-OFF performed by the force-OFF unit 133 with reference to a flowchart shown in FIG. 18. In step S11, the force-OFF unit 133 reads out a processing value for force-OFF that is stored in the memory 304 via the CPU 102 and the CPU core 2, and stores the processing value in a buffer memory that is provided inside the force-OFF unit 133. This processing value is stored in the memory 304 as the density correction information 319. In step S12, the force-OFF unit 133 performs force-OFF based on the processing value stored in the buffer memory, where the exposure time corresponding to a sixteenth of one pixel is considered as the minimum unit of time for which force-OFF can be performed. As shown in FIG. 7B, one pixel is composed of sixteen pixel pieces that divide one dot of a 600 dpi image into sixteen pieces. The processing value is a value that corresponds to the number of pixel pieces for which the light-emitting unit 11 has been forcibly turned off (subjected to force-OFF). Force-OFF is the processing of forcibly turning the light-emitting unit 11 off at a predetermined rate (frequency) with respect to the main scanning direction, where one pixel is divided into sixteen pixel pieces arranged along the main scanning direction and each pixel piece is considered as the minimum unit on which the processing can be performed.

Figure 19A:
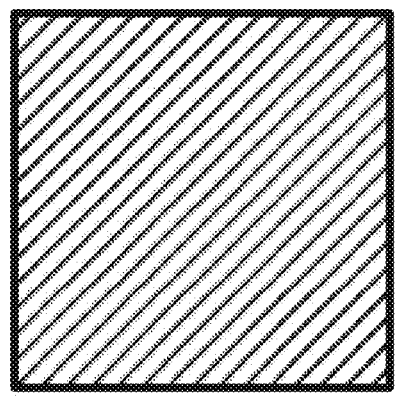
FIG. 19A to FIG. 19C are diagrams showing examples of light-emission data per pixel in a case where force-OFF has been performed.
Figure 19B:
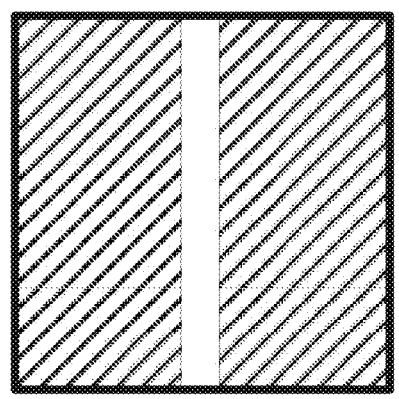
Figure 19C:
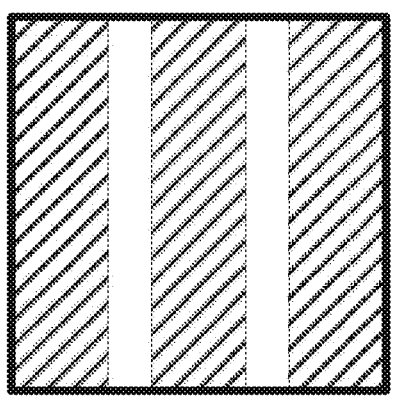

FIG. 19A to FIG. 19C each show light-emission data for one pixel when force-OFF is applied in the case where the image density value for the image data before application of force-OFF is FFh. Shaded portions indicate that the light-emitting unit 11 is turned on, and blank portions indicate that the light-emitting unit 11 is forcibly turned off. In particular, FIG. 19A shows light-emission data for one pixel in the case where the number of pixel pieces that are subjected to force-OFF is 0. In other words, the processing value is 0. FIG. 19B shows light-emission data for one pixel in the case where the number of pixel pieces that are subjected to force-OFF is 1. In other words, the processing value is 1. FIG. 19C shows light-emission data for one pixel in the case where the number of pixel pieces that are subjected to force-OFF is 2. In other words, the processing value is 2. In the present embodiment, the processing values for force-OFF are set by the density correction information 319 such that the number of pixel pieces to be subjected to force-OFF increases as the image height changes from the outermost off-axis image height to the on-axis image height (as the scanning position moves from an edge of the printing area to the center of the printing area). In other words, the density decreases due to force-OFF as the image height Y approaches the on-axis image height. This is because, at the on-axis image height, the scanning speed is the lowest, the exposure amount per unit area is the maximum, and the image density per unit area is the highest.

The 16-bit parallel signal 134 that is generated by the force-OFF unit 133 applying force-OFF to the image data is output to the PS conversion unit 123. Processing performed by subsequent stages including the PS conversion unit 123 is the same as that in the first embodiment.

FIG. 20 is a timing chart showing the case where force-OFF is performed as density correction in addition to partial magnification correction and luminance correction. A description of partial magnification correction and luminance correction in the third embodiment is omitted because it is the same as the description in the second embodiment. For density correction, the printing area extending in the main scanning direction is divided into a plurality of areas. A density correction value (a processing value) is set for each divisional area by the density correction information 319. Here, the number of divisional areas for density correction is the same as the number of divisional areas for luminance correction. That is, the number of divisional area is 22.

The density correction value indicates the number of pixel pieces within one pixel that are subjected to force-OFF by the force-OFF unit 133 when the image density value for image data is FFh. The image density 318 is the image density in the case where, in addition to partial magnification correction and luminance correction, force-OFF is performed as density correction and then printing is performed. This image density is measured based on the image density of the printed image.

By setting the density correction value of the density correction information 319 so as to increase as the image height changes from the outermost off-axis image height to the on-axis image height (the scanning position moves from an edge of the printing area to the center of the printing area), the force-OFF unit 133 corrects the light-emission data such that the density of the image decreases as the scanning speed decreases. Consequently, it becomes possible to print an image on a recording medium with a substantially reduced image density, and to ultimately obtain an appropriate image density from the outermost off-axis image height to the on-axis image height. In particular, in the case where the image density value of the image data is constant with respect to the main scanning direction, it is possible to maintain the image density to be constant at each main scanning position as indicated by the image density 318 after correction shown in FIG. 16.

Note that the pixel pieces to be subjected to force-OFF is not limited to any particular pixel pieces in one pixel. When the processing value for force-OFF is greater than or equal to 2, a plurality of pixel pieces in one pixel is subjected to force-OFF. If this is the case, the density correction information 319 is created such that at least one pixel piece that is not subjected to force-OFF is positioned between pixel pieces that are subjected to force-OFF. Such a configuration has the effect of further improving image density evenness. Also, the processing value for force-OFF may be a value that is smaller than 1. For example, a processing value of 0.5 indicates that one pixel piece out of two pixel pieces that are successive in the main scanning direction is subjected to force-OFF.

As described above, the present embodiment makes it possible to reduce image failure without using a scanning lens having the fθ characteristics by performing force-OFF as density correction in addition to partial magnification correction and luminance correction.

CONCLUSION

As described with reference to FIG. 2A, the imaging lens 406 with which the scanning speed is not constant can be provided between the deflector 405 and the photosensitive drum 4 in the light path of the laser beam 208. The scanning speed is the speed at which the spot of the laser beam 208 moves on the surface of the photosensitive drum 4. The imaging lens 406 functions as a scanning lens. Furthermore, as described with reference to FIG. 4 to FIG. 6, FIG. 8, FIG. 11, and so on, the insertion/removal control unit 128 and so on function as a width correction unit. In other words, the insertion/removal control unit 128 and so on correct the exposure time (the scanning time) for each of the latent images respectively corresponding to the pixels of the image data such that the widths of the latent images in the moving direction of the spot of the laser beam 208 are equal. Consequently, the respective partial magnifications at exposure positions become equal. Furthermore, as described with reference to FIG. 12 and so on, the luminance correction unit 330 functions as a luminance correction unit that corrects the luminance of the laser beam 208 for each of the latent images respectively corresponding to the pixels that have been subjected to width correction such that the exposure amount for each of the latent images is adjusted according to the exposure time of the corresponding latent image. As shown in FIG. 11, the V-to-I conversion unit 306 and so on correct the luminance of the laser beam 208 such that the exposure amount per unit time is greater for a position at which the scanning speed is higher among the exposure positions (the main scanning positions) on the photosensitive drum 4. For example, the luminance correction unit corrects the luminance of the laser beam for forming latent images such that the exposure amount per unit time is greater for a second position than for a first position among the exposure positions on the photosensitive member. The first position is scanned at a first scanning speed, and the second position is scanned at a second scanning speed that is higher than the first scanning speed. As shown in FIG. 11, the scanning speed increases as the exposure position approaches the edges of the printing area, and the luminance is accordingly increased. Consequently, it becomes possible to provide the image forming apparatus 9 with reduced variation in the partial magnification and reduced image density unevenness despite the use of an optical system with which the moving speed of the spot of the laser beam on the surface of the photosensitive member is not constant.

Note that as described with reference to FIG. 11, it is conceivable that image density unevenness cannot be sufficiently reduced by luminance correction alone. In particular, the level differences in the image density become noticeable in some cases. Considering the above, the density correction unit 121 may correct the density value of each pixel so as to reduce the level differences in the image density caused by correcting the luminance of the laser beam 208. Consequently, it becomes possible to provide the image forming apparatus 9 with further reduced image density unevenness.

As described with reference to FIG. 15 and so on, the density correction resolution of the density correction unit 121 with respect to the main scanning direction may be set to be higher than or equal to the luminance correction resolution of the luminance correction unit 330 with respect to the main scanning direction. Consequently, it becomes possible to accurately reduce density level differences due to luminance correction.

As described with reference to the second embodiment, the density correction resolution of the density correction unit 121 with respect to the exposure amount per unit time may be set to be higher than or equal to the luminance correction resolution of the luminance correction unit 330 with respect to the exposure amount per unit time. Consequently, it becomes possible to further accurately reduce the density level differences caused by luminance correction.

As described with reference to the first embodiment, the density correction unit 121 may correct the density value of each of the pixels of the image data according to the scanning position of the laser beam 208 on the surface (the circumferential surface) of the photosensitive drum 4. Also, as described with reference to the third embodiment, the force-OFF unit 133, instead of the density correction unit 121, may function as the density correction unit. The force-OFF unit 133 corrects the image density of each pixel by turning off the light source 401 during a period of time that corresponds to a pixel piece having a length that is shorter than the length of one pixel with respect to the moving direction of the spot of the laser beam 208. Consequently, it becomes possible to accurately reduce the density level differences caused by luminance correction.

As described for FIG. 3, the scanning speed of the laser beam 208 increases as the scanning position moves in the direction from the center of the image forming area of the photosensitive drum 4 to an edge of the image forming area. Therefore, the partial magnification varies for each scanning position. In particular, if a scanning lens having the fθ characteristics is omitted, this phenomenon becomes noticeable. For this reason, the above-described width correction, namely, partial magnification correction is necessary.

The ratio of the change between the scanning speed of the laser beam 208 at the edges of the image forming area of the photosensitive drum 4 and the scanning speed of the laser beam 208 at the center of the image forming area of the photosensitive drum 4 is higher than or equal to 20%. As described above, it is difficult to maintain a preferable image quality with an optical configuration in which the ratio of change of the scanning speed is higher than or equal to 20%. In particular, variations in the partial magnification with respect to the main scanning direction and variations in the total exposure amount per unit length become prominent. For this reason, partial magnification correction and luminance correction according to the embodiments are required. As described with reference to FIGS. 2A and 2B, if an optical configuration in which the ratio of change is higher than or equal to 20% is permissible, the distance D2 from the deflector 405 to the scanned surface 407 can be reduced, and accordingly the optical scanning device 400 can be reduced in size.

To perform width correction, for example, the insertion/removal control unit 128 may correct the exposure time (scanning time) for each of the latent images respectively corresponding to the pixels by inserting/removing a pixel piece into/from the image data. The width of a pixel piece in the moving direction of the spot of the laser beam 208 (the main scanning direction) is shorter than the width of one pixel. For example, the insertion/removal control unit 128 may perform insertion of a pixel piece with respect to a central area of the printing area (the image forming area) of the photosensitive drum 4 in the main scanning direction. Also, the insertion/removal control unit 128 may perform removal of a pixel piece with respect to edge areas of the image forming area in the main scanning direction. Consequently, it becomes possible to appropriately correct the partial magnification.

Instead of the insertion/removal control unit 128, the CPU 102 may function as the width correction unit. The CPU 102 may correct the exposure time for each of the latent images respectively corresponding to the pixels by controlling the PLL unit 127 and changing the frequency of a clock signal (VCLK×N, where N is a number for multiplication) that has synchronized with the video signal that conveys the image data according to the scanning position in the main scanning direction. Consequently, it becomes possible to adjust the exposure time for each latent image such that the respective partial magnifications at the scanning positions are equal. In particular, by increasing the frequency of the clock signal that has synchronized with the video signal as the scanning position moves in the direction from the center of the image forming area of the photosensitive drum 4 to the edges of the image forming area, it becomes possible for the CPU 102 to adjust the scanning time so as to decrease as the scanning position moves in the direction from the center of the image forming area to the edges of the image forming area. That is, it becomes possible to reduce variations among the widths of the latent images respectively corresponding to the pixels of the image data.

As described with reference to FIG. 4, the laser drive unit 300 may have the constant current circuit 15 that supplies the first current Ia. The laser drive unit 300 may drive the light source 401 by supplying the light source 401 with the third current IL that is obtained by subtracting, from the first current Ia, the second current Id that is output by the luminance correction unit 330. The luminance correction unit 330 configured with the control unit 1, the laser drive unit 300, and so on may correct the luminance of the laser beam 208 by changing the second current Id according to the scanning position of the laser beam 208 on the surface of the photosensitive drum 4. Consequently, it becomes possible to accurately correct the luminance.

In the embodiments above, a description has been given of an example in which the image density is corrected by the density correction unit 121 correcting the image data. Various image densities are realized by controlling the duty ratio of the drive current that drives the light source (pulse width modulation (PWM) control). For example, the image density is adjusted by variable control of the duty ratio with reference to the duty ratio for forming a solid image (with 100% density). That is, the density correction unit 121 may directly correct the image data of the pixels, or control the duty ratio of the PWM signal (drive current) corresponding to the image data of the pixels.

Various units are described above with reference to the drawings such as FIGS. 4, 6, 12 and 17. These units may be implemented by a hardware (e.g. CPU (Central Processing Unit), FPGA (Field Programmable Gate Array), ASIC (Application Specific Integrated Circuits), and analogue and/or digital circuit) and/or a software (e.g. computer program).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-031054, filed Feb. 19, 2015, which is hereby incorporated by reference wherein in its entirety.

What is claimed is:

1. An image forming apparatus comprising:
   a photosensitive member;
   a scanning unit configured to perform scanning over the photosensitive member with a laser beam that is irradiated from a light source;
   a width correction unit configured to correct exposure time for individual latent images respectively corresponding to pixels of image data such that widths of the latent images in a moving direction of a spot of the laser beam become closer to a constant width;
   a luminance correction unit configured to correct luminance of the laser beam for forming latent images such that an exposure amount per unit time is greater for a second position than for a first position among exposure positions on the photosensitive member, the first position being scanned at a first scanning speed, and the second position being scanned at a second scanning speed that is higher than the first scanning speed; and
   a density correction unit configured to correct a density value of each of the pixels of the image data according to a scanning position of the laser beam on a surface of the photosensitive member.

2. The image forming apparatus claimed in claim 1, an optical system that is provided between the scanning unit and the photosensitive member in a light path of the laser beam, that allows the laser beam to pass through, and with which a scanning speed is not constant, the scanning speed being a speed at which a spot of the laser beam moves on a surface of the photosensitive member.

3. The image forming apparatus claimed in claim 1, wherein the luminance correction unit corrects the luminance of the laser beam such that the exposure amount per unit time is greater for a position at which the scanning speed is higher among the exposure positions on the photosensitive member.

4. The image forming apparatus claimed in claim 1, wherein a density correction resolution of the density correction unit with respect to a main scanning direction is higher than or equal to a luminance correction resolution of the luminance correction unit with respect to the main scanning direction.

5. The image forming apparatus claimed in claim 1, wherein a density correction resolution of the density correction unit with respect to the exposure amount per unit time is higher than or equal to a luminance correction resolution of the luminance correction unit with respect to the exposure amount per unit time.

6. The image forming apparatus claimed in claim 1, wherein the density correction unit corrects image densities of the latent images by correcting the density value of each of the pixels of the image data according to the scanning position of the laser beam on the surface of the photosensitive member.

7. The image forming apparatus claimed in claim 1, wherein the density correction unit corrects image densities of the latent images by turning off the light source during a period of time that corresponds to a pixel piece having a length that is shorter than a length of one pixel with respect to the moving direction of the spot of the laser beam.

8. The image forming apparatus claimed in claim 1, wherein a scanning speed of the laser beam increases as the scanning position moves in a direction from a center of an image forming area of the photosensitive member to an edge of the image forming area.

9. The image forming apparatus claimed in claim 1, wherein a ratio of a change between a scanning speed of the laser beam at a center of an image forming area of the photosensitive member and a scanning speed of the laser beam at an edge of the image forming area of the photosensitive member is higher than or equal to 20%.

10. The image forming apparatus claimed in claim 1, wherein the width correction unit corrects the exposure time for the individual latent images respectively corresponding to the pixels by inserting/removing a pixel piece into/from the image data, the pixel piece having a length that is shorter than a length of one pixel with respect to the moving direction of the spot of the laser beam.

11. The image forming apparatus claimed in claim 10, wherein the width correction unit inserts the pixel piece into the image data when the scanning position is located in a central area of the image forming area of the photosensitive member in the moving direction of the spot of the laser beam, and removes the pixel piece from the image data when the scanning position is located in an edge portion of the image forming area in the moving direction of the spot of the laser beam.

12. The image forming apparatus claimed in claim 1, wherein the width correction unit corrects the exposure time for the individual latent images respectively corresponding to the pixels of the image data by changing a frequency of a clock signal that has synchronized with a video signal that conveys the image data, according to the scanning position in a main scanning direction.

13. The image forming apparatus claimed in claim 12, wherein the width correction unit increases the frequency of the clock signal that has synchronized with the video signal as the scanning position moves in a direction from a center of an image forming area of the photosensitive member to an edge of the image forming area.

14. The image forming apparatus claimed in claim 1, further comprising
   a drive unit having a constant current circuit that outputs a first current, and configured to drive the light source by supplying the light source with a third current that is obtained by subtracting, from the first current, a second current that is output by the luminance correction unit, wherein
   the luminance correction unit corrects the luminance of the laser beam by changing the second current according to the scanning position of the laser beam on the surface of the photosensitive member.

15. The image forming apparatus claimed in claim 1, wherein the density correction unit corrects the density value of each of the pixels by correcting the image data.

16. The image forming apparatus claimed in claim 1, wherein the light source is configured to output the laser beam upon being supplied with a pulse width modulation signal having a duty ratio that is determined according to the image data, and the density correction unit corrects the density value of each of the pixels by controlling the duty ratio corresponding to the image data.

17. The image forming apparatus claimed in claim 1, wherein the luminance correction unit is further configured to correct the luminance of the laser beam for forming latent images such that the exposure amount per latent image is adjusted according to an exposure time for individual latent images corrected by the width correction unit, and wherein the density correction unit is further configured to correct the density value of each of the pixels of the image data such that level differences in an image density caused by correction of the luminance of the laser beam by the luminance correction unit are reduced.

18. A method of forming an image comprising:

deflecting a laser beam irradiated from a light source with a scanning unit, and scanning over a photosensitive member with the laser beam;

correcting exposure time for individual latent images respectively corresponding to pixels of the image data such that widths of the latent images in a moving direction of a spot of the laser beam become closer to a constant width;

correcting luminance of the laser beam for forming latent images such that an exposure amount per unit time is greater for a second position than for a first position among exposure positions on the photosensitive member, the first position being scanned at a first scanning speed, and the second position being scanned at a second scanning speed that is higher than the first scanning speed; and correcting a density value of each of the pixels of the image data according to a scanning position of the laser beam on a surface of the photosensitive member, wherein the luminance of the laser beam is corrected such that the exposure amount per unit time is greater for a position at which the scanning speed is higher among the exposure positions on the photosensitive member.

19. The method claimed in claim 18, wherein in said step of correcting luminance, the luminance of the laser beam is corrected for each forming latent image such that the exposure amount per latent image is adjusted according to the corrected exposure time for individual latent images, and wherein in said step of correcting density correction, the density value of each of the pixels of the image data is corrected such that level differences in an image density caused by correction of the luminance of the laser beam by said step of correcting luminance are reduced.

* * * * *